US010764528B2

(12) United States Patent
Ju et al.

(10) Patent No.: US 10,764,528 B2
(45) Date of Patent: Sep. 1, 2020

(54) MOBILE TERMINAL AND CONTROL METHOD THEREOF

(71) Applicant: LG ELECTRONICS INC., Seoul (KR)

(72) Inventors: Wanho Ju, Seoul (KR); Youngjun Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 102 days.

(21) Appl. No.: 16/073,275

(22) PCT Filed: Jan. 27, 2016

(86) PCT No.: PCT/KR2016/000858
§ 371 (c)(1),
(2) Date: Jul. 26, 2018

(87) PCT Pub. No.: WO2017/131248
PCT Pub. Date: Aug. 3, 2017

(65) Prior Publication Data
US 2019/0007642 A1  Jan. 3, 2019

(51) Int. Cl.
*H04N 5/44* (2011.01)
*H04N 5/262* (2006.01)
(Continued)

(52) U.S. Cl.
CPC ........ *H04N 5/4403* (2013.01); *G06F 3/0485* (2013.01); *G06F 3/04815* (2013.01);
(Continued)

(58) Field of Classification Search
CPC . G06F 2203/04806; G06F 2203/04808; G06F 3/04815; G06F 3/04845;
(Continued)

(56) References Cited

U.S. PATENT DOCUMENTS 6,590,586 B1 * 7/2003 Swenton-Wall ........ G06F 16/54
715/730
7,995,061 B2 * 8/2011 Kim ...................... G06F 3/0482
345/440
(Continued)

FOREIGN PATENT DOCUMENTS

JP  2005-109758 A  4/2005
KR  10-2014-0008568 A  1/2014
(Continued)

*Primary Examiner* — Peter D Le
(74) *Attorney, Agent, or Firm* — Birch, Stewart, Kolasch & Birch, LLP

(57) ABSTRACT

A mobile terminal, according to one embodiment of the present invention, comprises: a wireless communication unit for communicating with an external device or an external server; a display unit for displaying a specific viewing area of a surround video comprising a plurality of viewing areas; and a control unit for playing the surround video in a first viewing area, and playing the surround video in a second viewing area according to a first command requesting a viewing area change, wherein the control unit controls the wireless communication unit so as to receive data comprising a path of the viewing area from the preset external device or the preset external server according to a second command, controls the display unit so as to display, on a partial area of a screen, a thumbnail image indicating the path by using the received data, and changes the viewing area of the surround video being played, on the basis of the path included in the received data according to a third command for selecting the thumbnail image.

18 Claims, 25 Drawing Sheets

(51) Int. Cl.
*H04N 21/6587* (2011.01)
*H04N 21/81* (2011.01)
*G06F 3/0481* (2013.01)
*H04N 21/4728* (2011.01)
*H04N 21/2343* (2011.01)
*G06F 3/0485* (2013.01)
*H04N 5/225* (2006.01)
*G06F 3/0484* (2013.01)
*G06F 3/0488* (2013.01)
*G11B 27/00* (2006.01)
*H04N 13/117* (2018.01)
*H04N 5/232* (2006.01)
*H04N 13/344* (2018.01)
*H04N 13/239* (2018.01)
*H04N 13/30* (2018.01)
*H04N 5/445* (2011.01)

(52) U.S. Cl.
CPC ...... *G06F 3/04845* (2013.01); *G06F 3/04883* (2013.01); *G11B 27/00* (2013.01); *H04N 5/2258* (2013.01); *H04N 5/23238* (2013.01); *H04N 5/262* (2013.01); *H04N 13/117* (2018.05); *H04N 21/234345* (2013.01); *H04N 21/4728* (2013.01); *H04N 21/6587* (2013.01); *H04N 21/816* (2013.01); *H04N 21/8153* (2013.01); *G06F 2203/04806* (2013.01); *G06F 2203/04808* (2013.01); *H04N 5/44591* (2013.01); *H04N 13/239* (2018.05); *H04N 13/30* (2018.05); *H04N 13/344* (2018.05); *H04N 2005/443* (2013.01)

(58) Field of Classification Search
CPC ... G06F 3/0485; G06F 3/04883; G11B 27/00; H04N 13/117; H04N 13/239; H04N 13/30; H04N 13/344; H04N 2005/443; H04N 21/234345; H04N 21/4728; H04N 21/6587; H04N 21/8153; H04N 21/816; H04N 5/2258; H04N 5/23238; H04N 5/262; H04N 5/4403; H04N 5/44591
See application file for complete search history.

(56) References Cited

U.S. PATENT DOCUMENTS

| | | | |
|---|---|---|---|
| 8,306,515 B2* | 11/2012 | Ryu | G06Q 10/10 455/414.1 |
| 8,375,307 B2* | 2/2013 | Kim | G06Q 10/107 709/206 |
| 8,375,333 B2* | 2/2013 | Kang | G06F 3/0482 715/838 |
| 8,406,752 B2* | 3/2013 | Kim | G06F 3/0482 455/418 |
| 8,433,370 B2* | 4/2013 | Jung | G06T 11/00 455/566 |
| 8,468,459 B2* | 6/2013 | Jeong | H04M 1/72555 348/207.1 |
| 10,019,140 B1* | 7/2018 | Bell | G06F 1/1686 |
| 10,110,939 B1* | 10/2018 | Wittke | H04N 21/26283 |
| 2002/0120498 A1* | 8/2002 | Gordon | G06Q 30/02 705/14.53 |
| 2003/0026594 A1* | 2/2003 | Shiiyama | G11B 27/105 386/241 |
| 2003/0133032 A1* | 7/2003 | Aoki | H04N 1/00387 348/333.05 |
| 2004/0243726 A1* | 12/2004 | O'Keefe | G06F 3/023 710/1 |
| 2005/0034084 A1* | 2/2005 | Ohtsuki | G06T 15/04 715/864 |
| 2007/0126889 A1* | 6/2007 | Kim | H04N 5/262 348/231.2 |
| 2007/0277125 A1* | 11/2007 | Shin | G06F 3/04883 715/863 |
| 2008/0254778 A1* | 10/2008 | Kim | G06F 3/0482 455/414.3 |
| 2010/0053220 A1* | 3/2010 | Ozawa | G06F 3/04845 345/661 |
| 2010/0099456 A1* | 4/2010 | Kim | G06F 3/0346 455/556.1 |
| 2011/0181779 A1* | 7/2011 | Park | H04N 21/44008 348/563 |
| 2012/0142379 A1* | 6/2012 | Park | H04M 1/72572 455/457 |
| 2012/0159337 A1* | 6/2012 | Travilla | G06Q 30/0631 715/738 |
| 2012/0240075 A1* | 9/2012 | Kim | G06F 3/0481 715/776 |
| 2013/0054319 A1* | 2/2013 | Woods | G06F 3/04815 705/14.4 |
| 2013/0071095 A1* | 3/2013 | Chauvier | G11B 27/005 386/343 |
| 2013/0091462 A1* | 4/2013 | Gray | G06F 3/0346 715/810 |
| 2013/0129317 A1* | 5/2013 | Moorer | H04N 21/23424 386/241 |
| 2013/0157722 A1* | 6/2013 | Kim | H04M 1/72563 455/566 |
| 2013/0167081 A1* | 6/2013 | Park | G06F 3/0481 715/804 |
| 2013/0176116 A1* | 7/2013 | Jung | G08C 17/02 340/12.5 |
| 2013/0331152 A1* | 12/2013 | Park | G06F 3/0481 455/566 |
| 2014/0085203 A1 | 3/2014 | Kobayashi | |
| 2014/0195527 A1* | 7/2014 | Kim | G06F 16/24575 707/723 |
| 2014/0282269 A1* | 9/2014 | Strutt | G06F 3/04883 715/863 |
| 2014/0344749 A1* | 11/2014 | Choi | G06F 3/04817 715/780 |
| 2014/0354845 A1* | 12/2014 | Molgaard | H04N 1/215 348/222.1 |
| 2014/0368734 A1* | 12/2014 | Hoffert | H04N 21/42224 348/564 |
| 2015/0019966 A1* | 1/2015 | Jeon | G06F 3/04817 715/716 |
| 2015/0128035 A1* | 5/2015 | Takae | G06F 3/016 715/702 |
| 2016/0191790 A1* | 6/2016 | Wang | H04N 5/23216 348/333.01 |
| 2016/0266752 A1* | 9/2016 | Wu | G06F 16/904 |
| 2018/0150216 A1* | 5/2018 | Choi | G06F 3/0412 |

FOREIGN PATENT DOCUMENTS

| | | |
|---|---|---|
| KR | 10-1784316 B1 | 10/2017 |
| WO | WO 2015/115695 A1 | 8/2015 |

* cited by examiner

FIG. 5
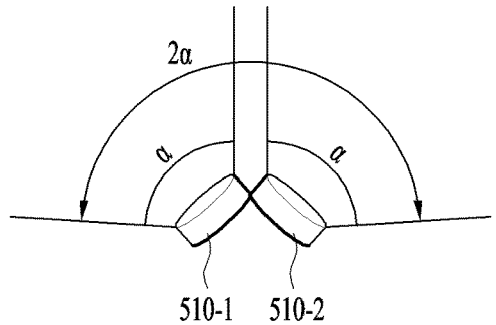
(a)
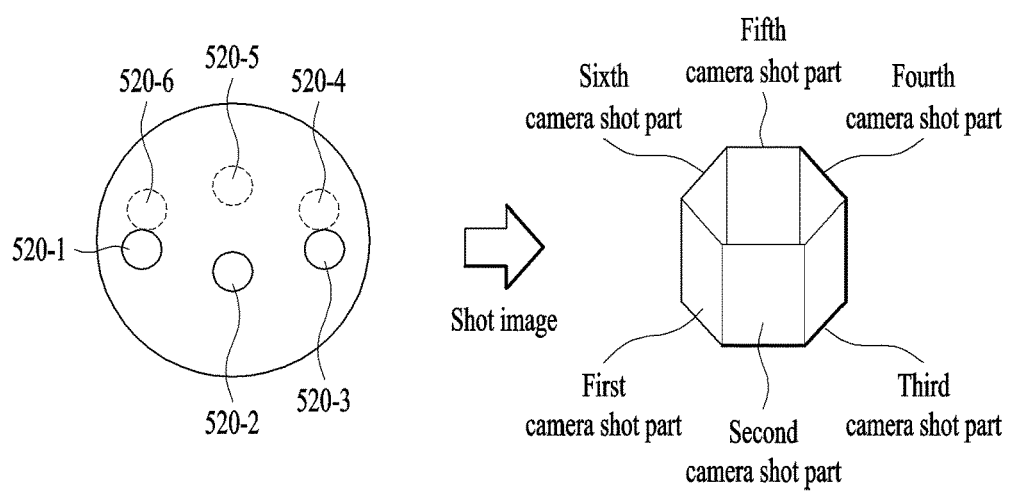
(b)
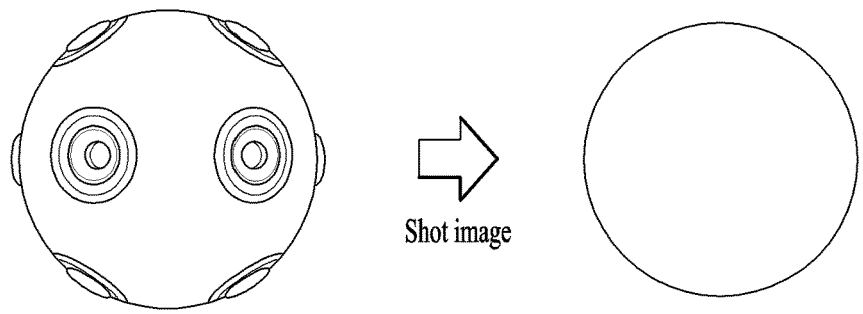
(c)

FIG. 6
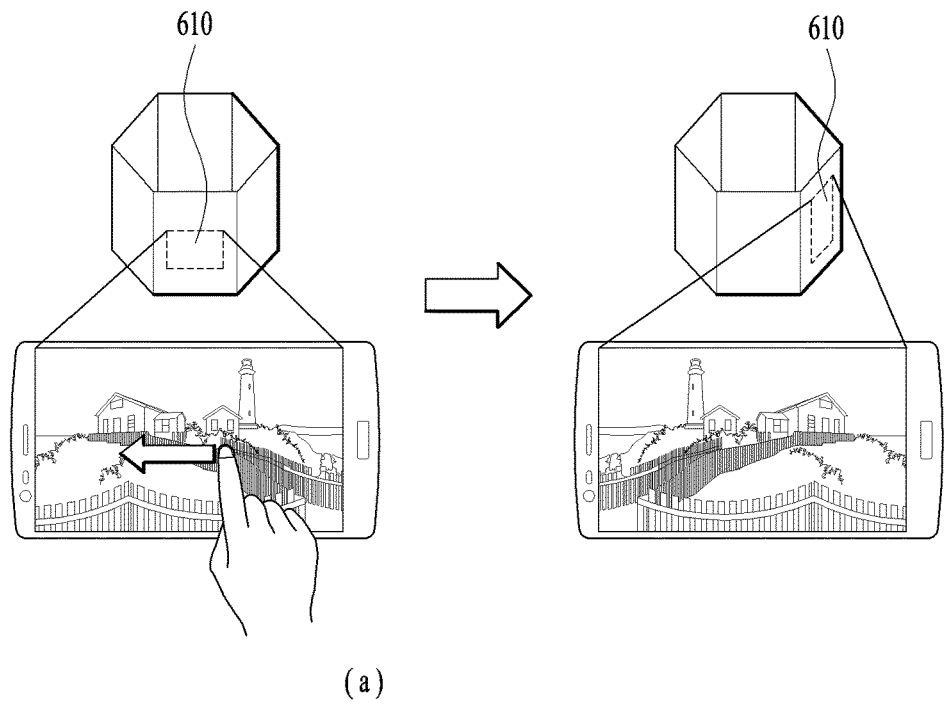
(a)
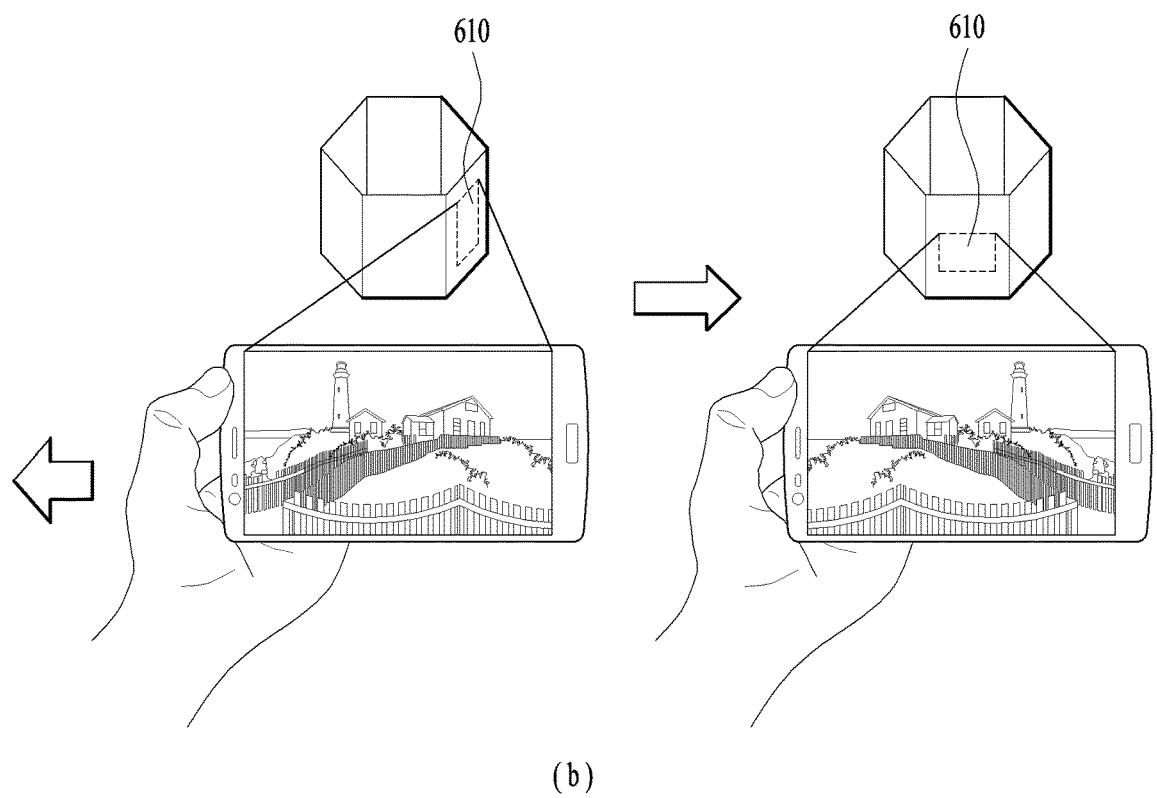
(b)

FIG. 7
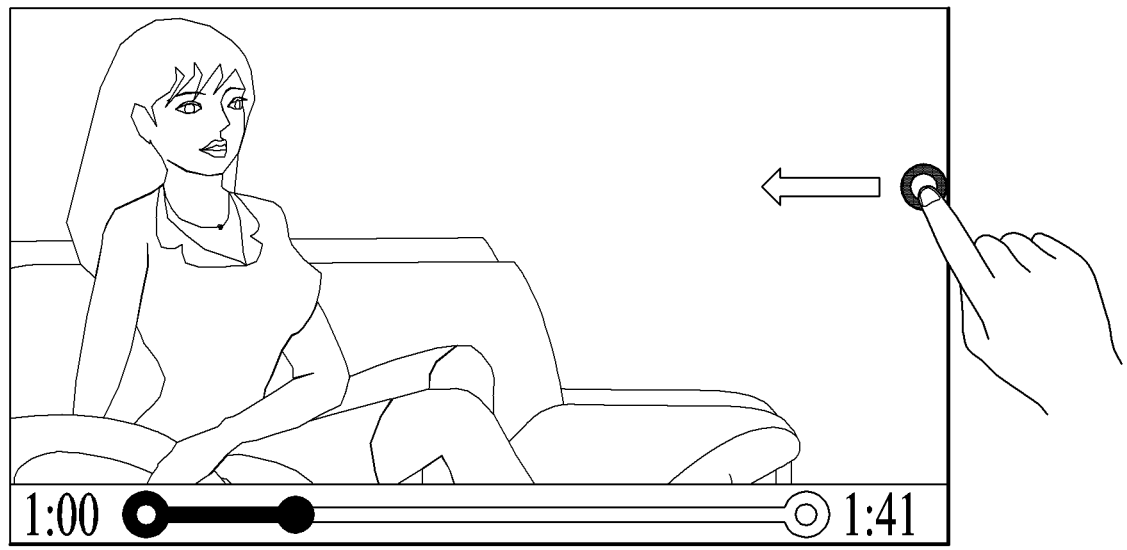
(a)
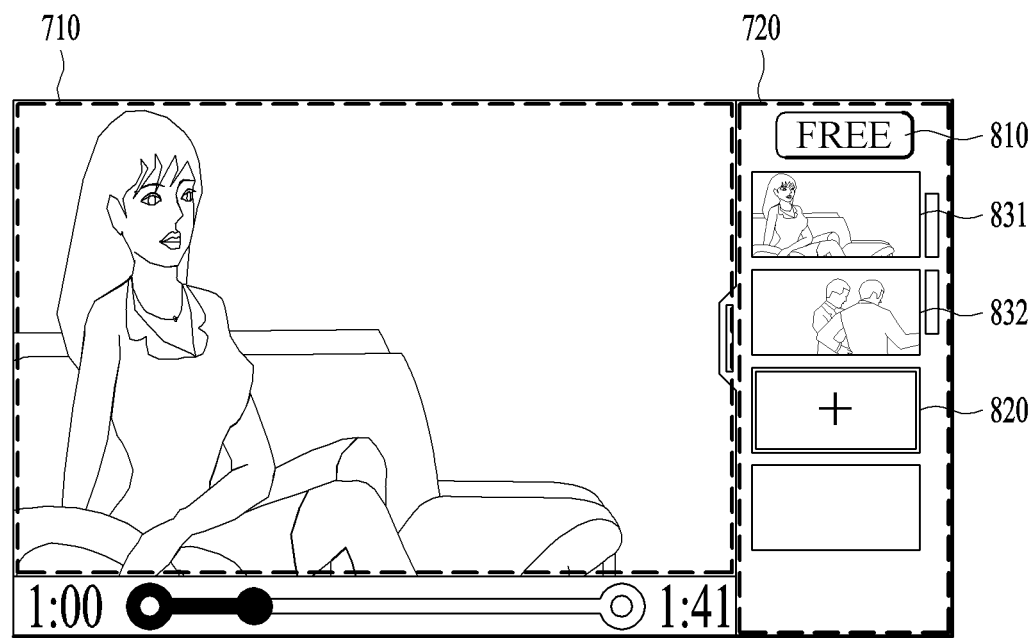
(b)

FIG. 8
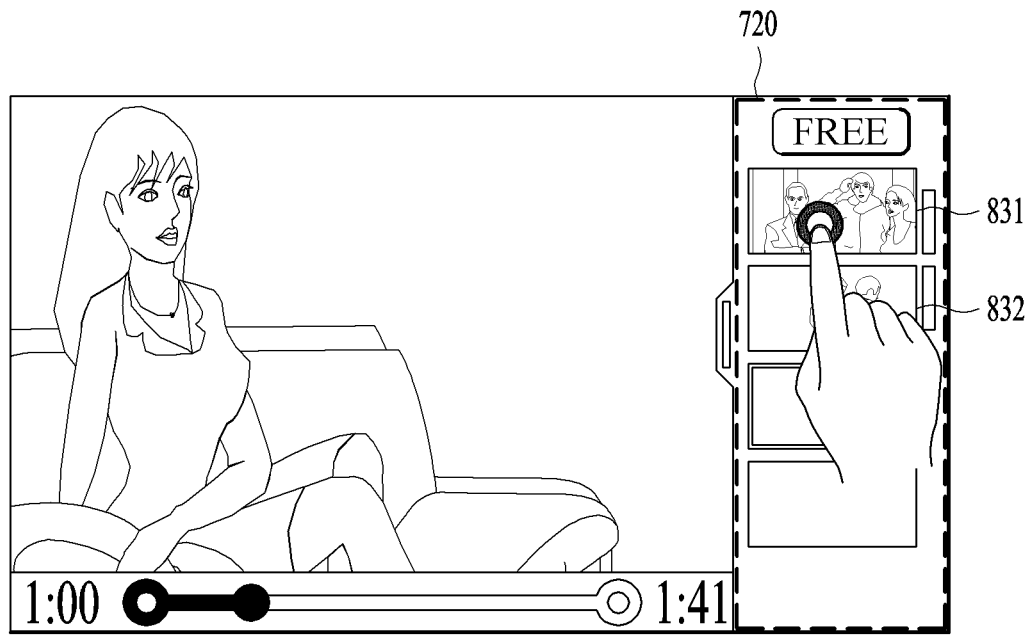
(a)
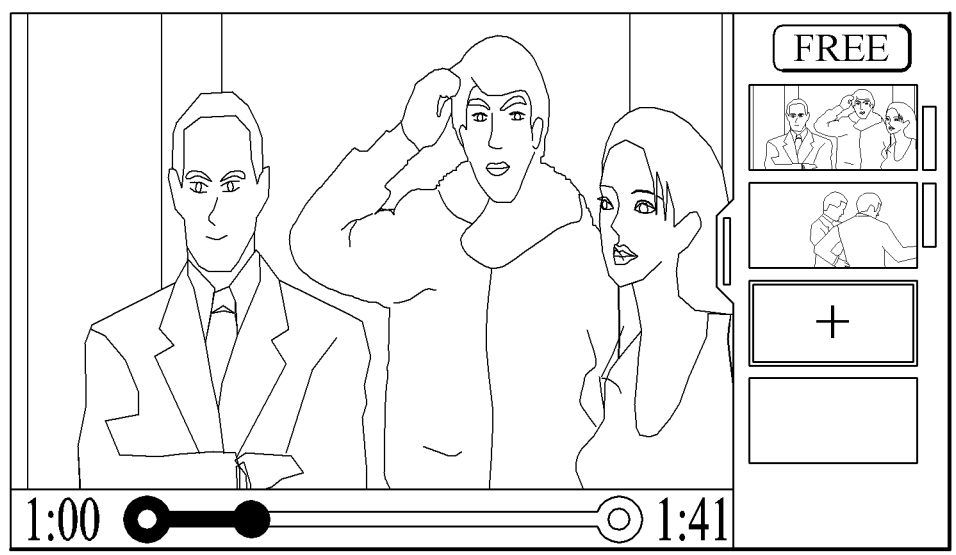
(b)

FIG. 9
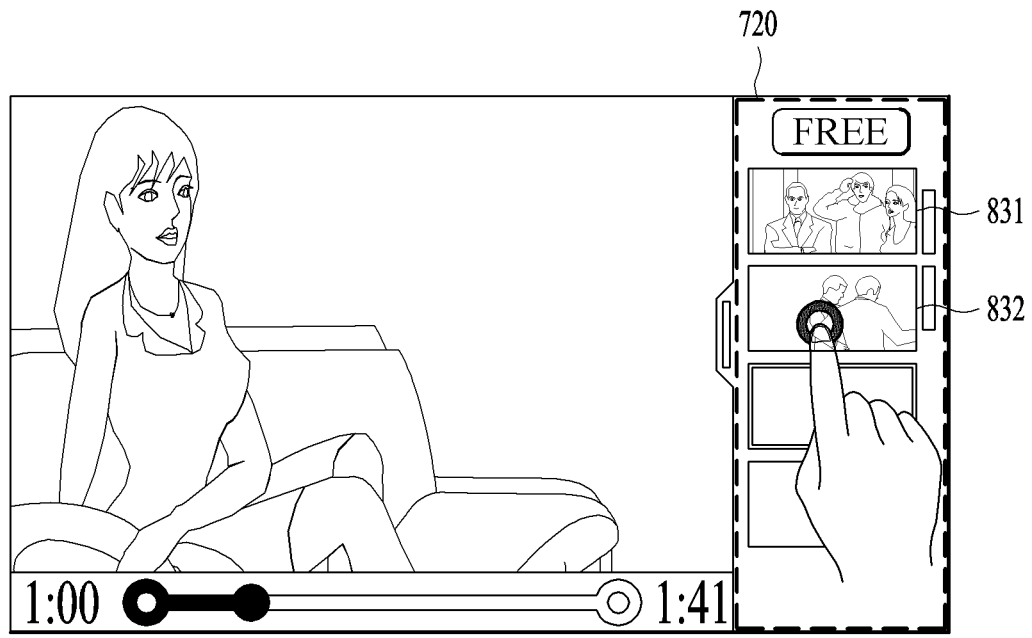
(a)
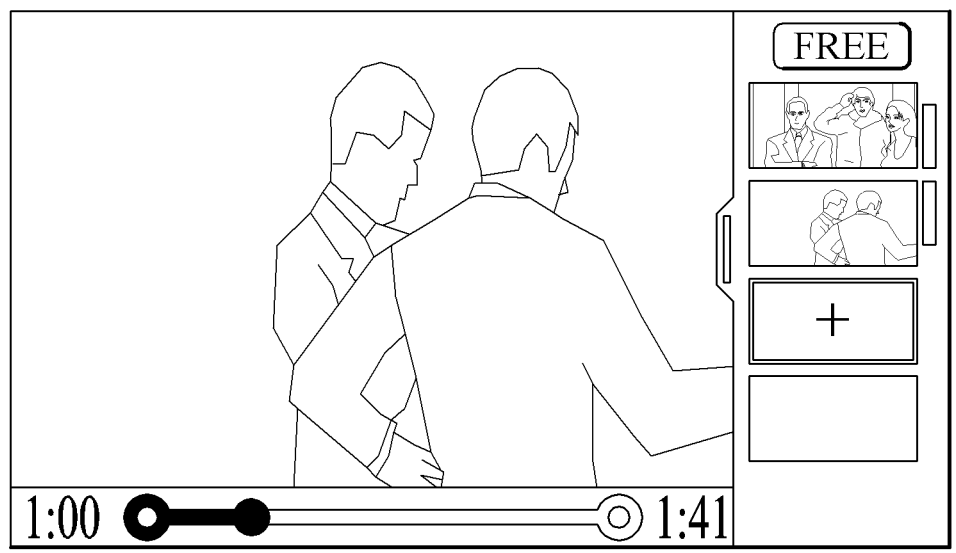
(b)

FIG. 13
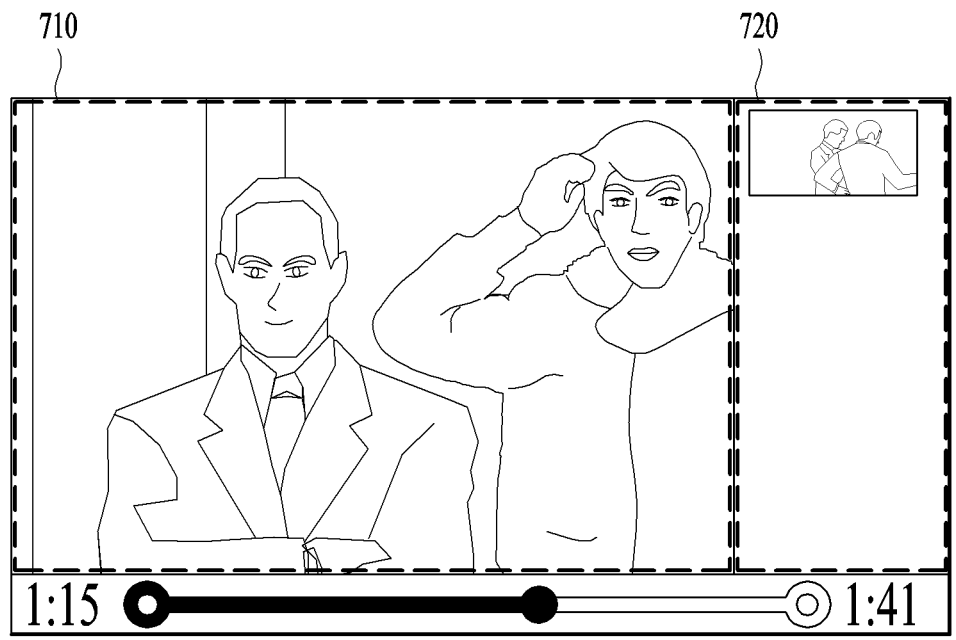
(a)
After playing as a first viewing area for a time less than a preset time, change a viewing area into a second viewing area
(b)

FIG. 14
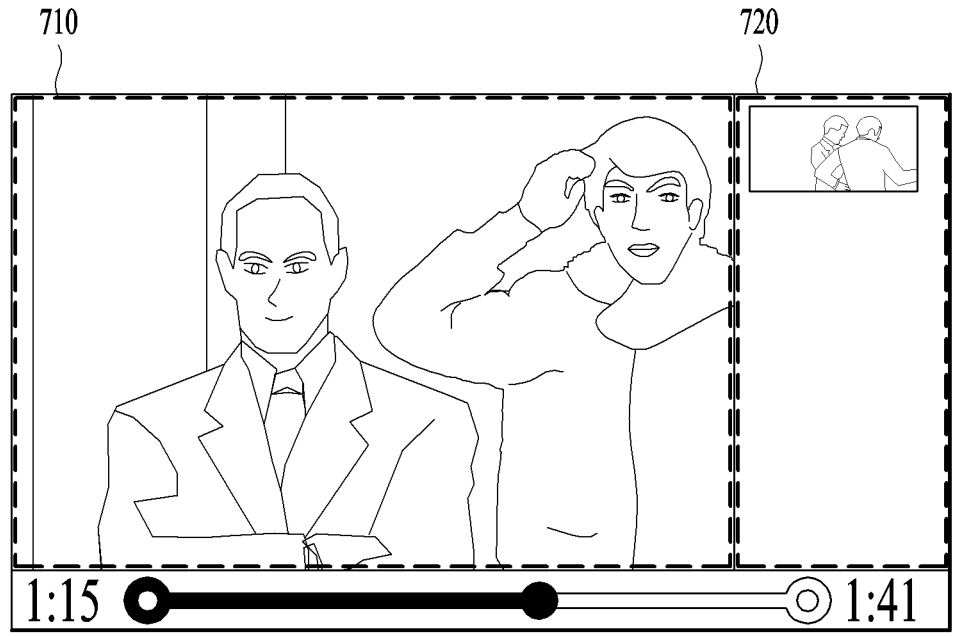
(a)
After playing as a first viewing area for a time more than a preset time, change a viewing area into a second viewing area
(b)

FIG. 15
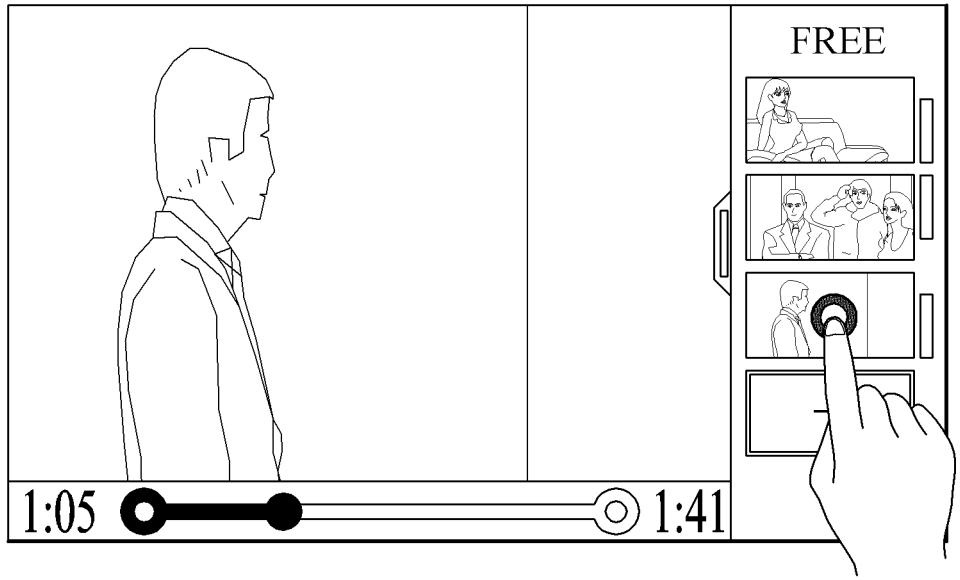
(a)
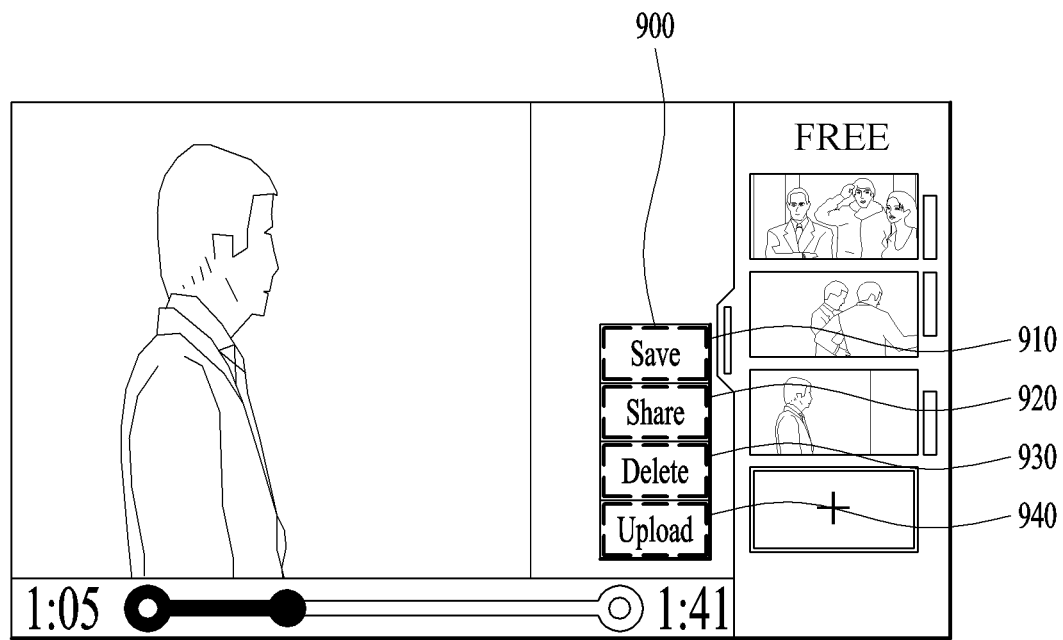
(b)

FIG. 16
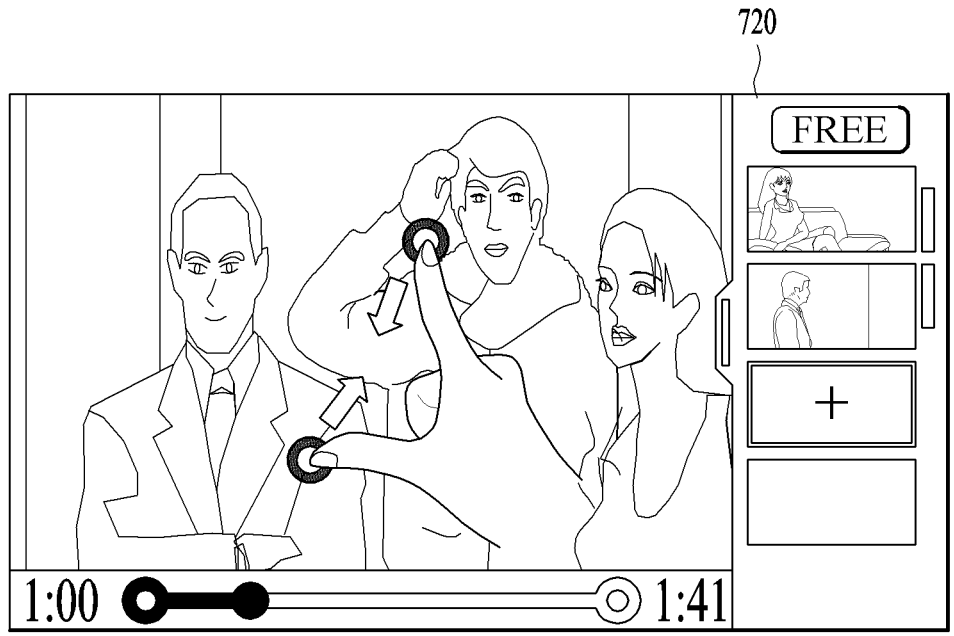
(a)
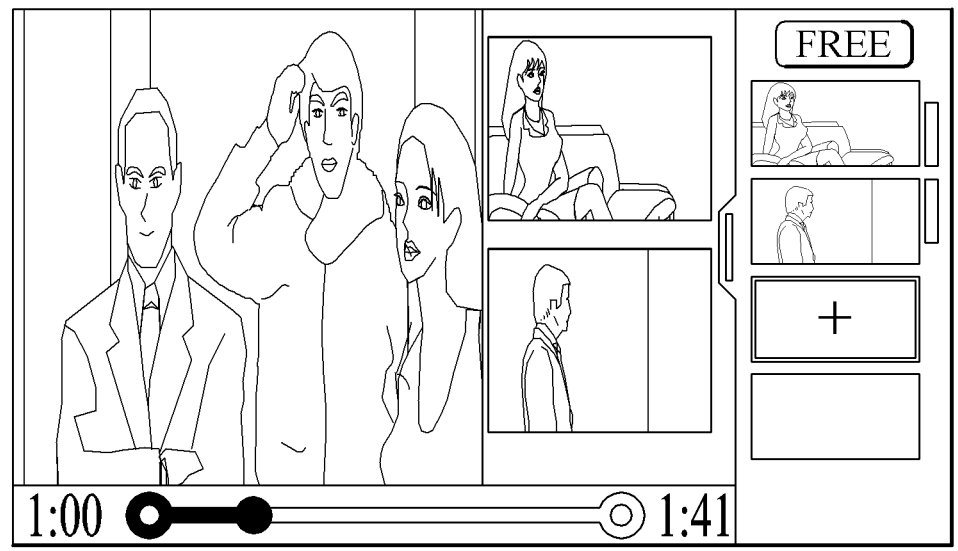
(b)

FIG. 17
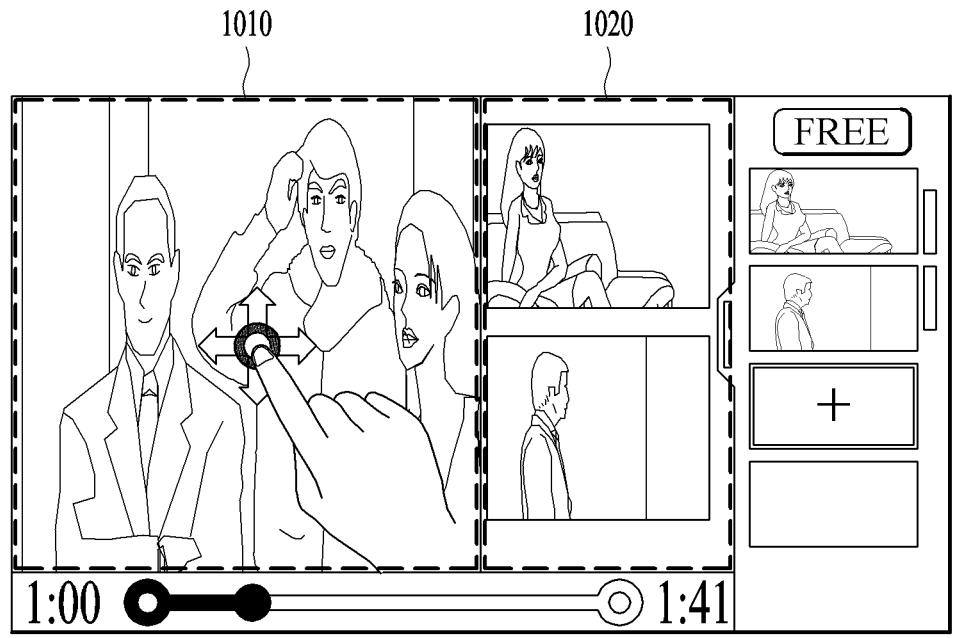
(a)
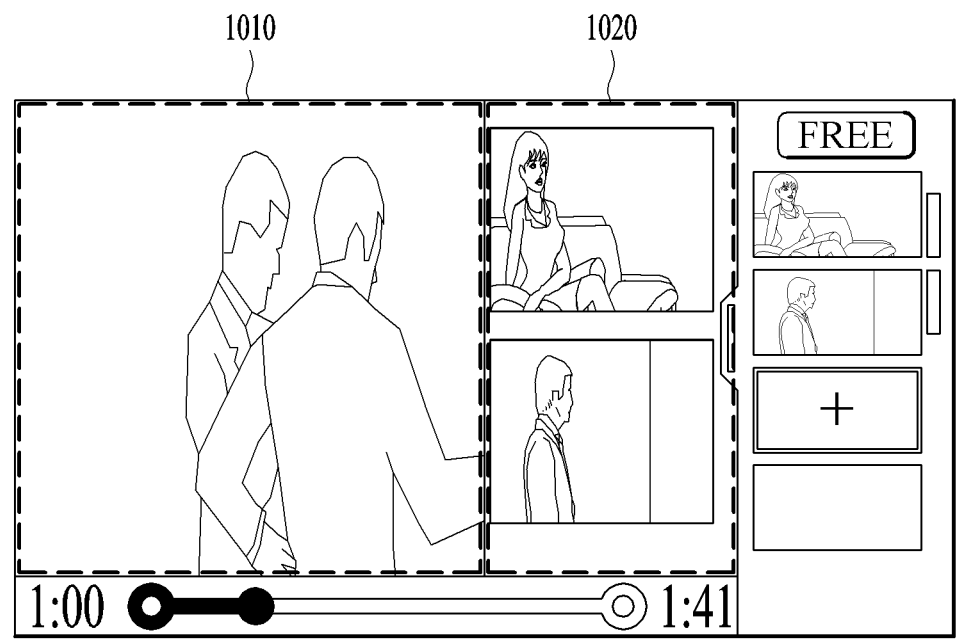
(b)

(a)            (b)

FIG. 21
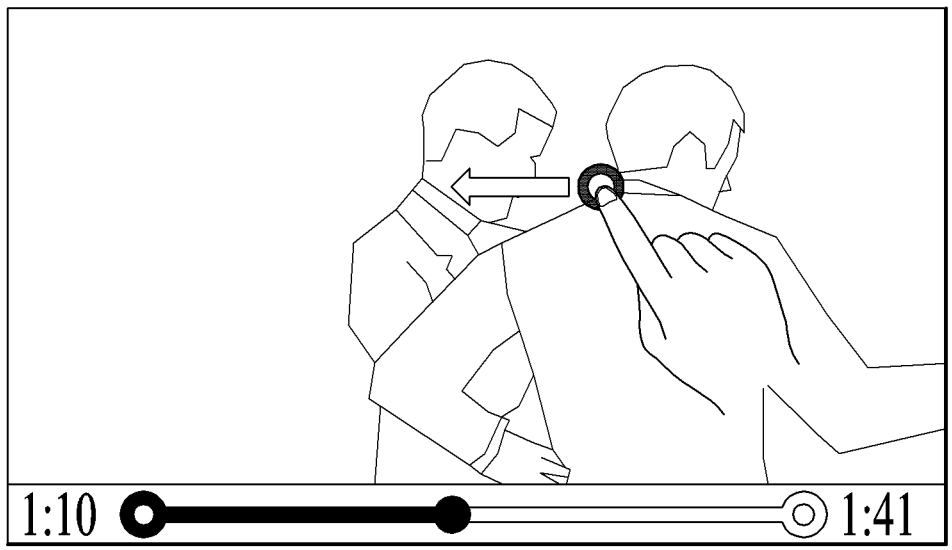
(a)
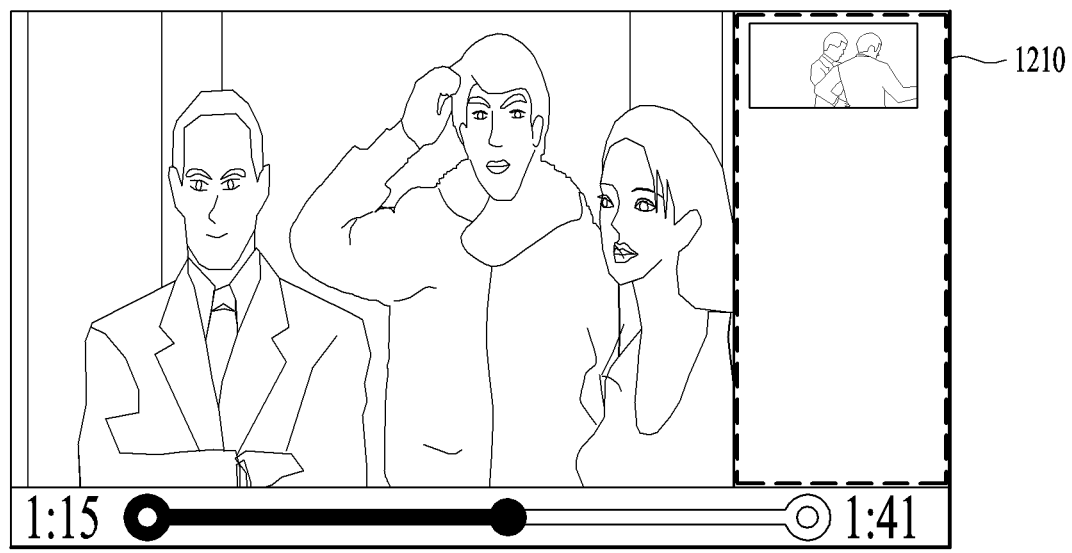
(b)

FIG. 22
(a)
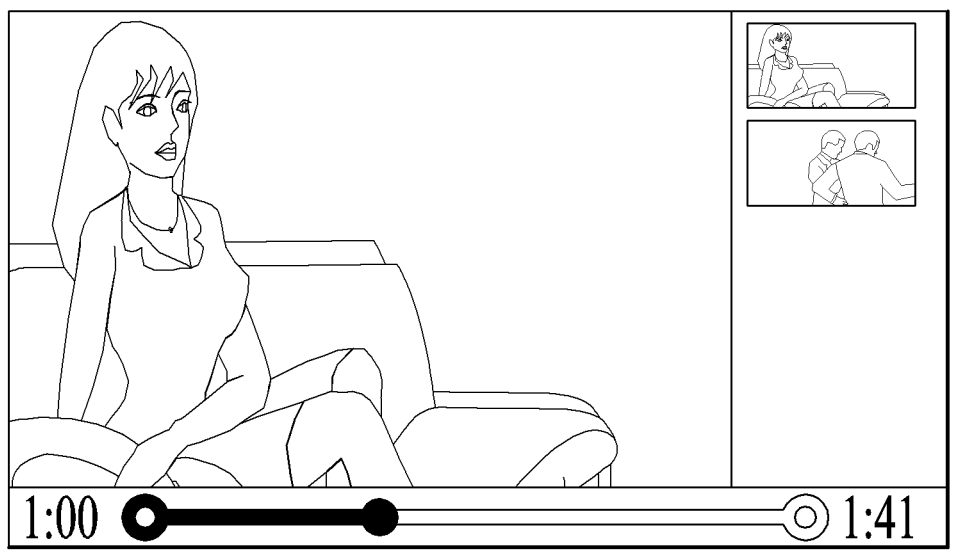
(b)

FIG. 23
(a)
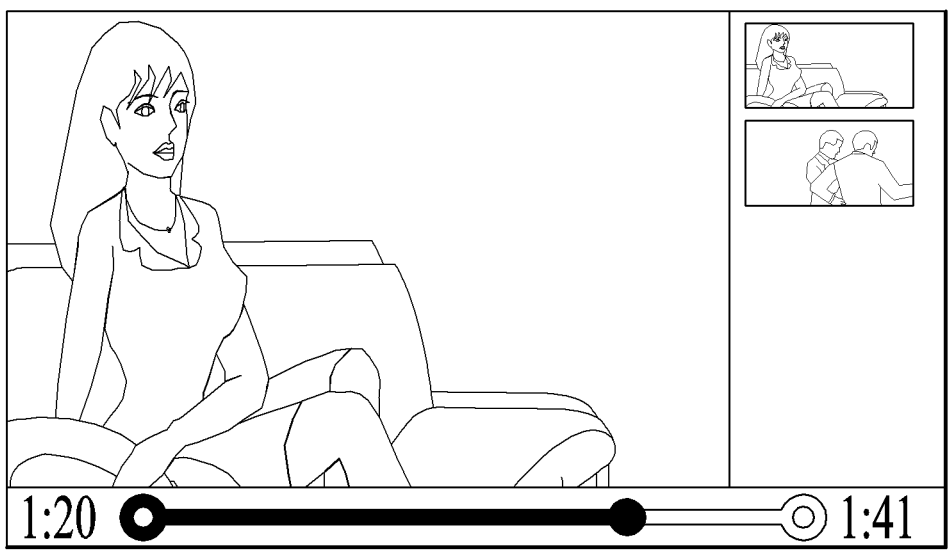
(b)

(a)  (b)

MOBILE TERMINAL AND CONTROL METHOD THEREOF

CROSS REFERENCE TO RELATED APPLICATIONS

This application is the National Phase of PCT/KR2016/000858 filed on Jan. 27, 2016, which is hereby expressly incorporated by reference into the present application.

TECHNICAL FIELD

The present invention relates to a mobile terminal and control method thereof.

BACKGROUND ART

Terminals can be classified into mobile/portable terminals and stationary terminals. In particular, the mobile terminals can be further classified into handheld terminals and vehicle mounted terminals according to possibility of user's direct portability.

Recently, functions of a mobile terminal tend to be diversified. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be implemented as a multimedia player provided with complex functions such as photographing of photos or videos, playback of music or video files, game play, broadcast reception and the like for example.

To support and increase the terminal functions, it may be able to consider improving structural parts and/or software parts of the terminal.

Recently, cameras capable of surround video shooting through a plurality of cameras have been developed.

For example, if a plurality of cameras are combined together, it is able to shoot a surround video that covers 360°.

In case of a surround video shot through a plurality of cameras, users may have different experiences depending on watching which part of the video.

For example, a user having watched a 0° to 180° part of a 360° shot video and a user having watched a 180° to 360° part of the video can acquire totally different experiences despite the same video.

Thus, it is necessary to consider a method for surround video watching users to acquire similar experiences.

DISCLOSURE OF THE INVENTION

Technical Task

The present invention is intended to solve the above problem and other problems. One technical task of one embodiment of the present invention is to provide a method of playing a surround video according to a path of a viewing area configured by a different user.

Another technical task is to save a path of a viewing area of a surround video displayed in a mobile terminal to a memory and enable the saved path to be shared with a different user.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a mobile terminal, including a wireless communication unit connecting communication with an external device or an external server, a display unit displaying a specific viewing area of a surround video including a plurality of viewing areas, and a controller configured to play the surround video as a first viewing area and play the surround video as a second viewing area in response to a first command for changing a viewing area, wherein the controller is further configured to control the wireless communication unit to receive data including a path of the viewing area from a preset external device or a preset external server in response to a second command, control the display unit to display a thumbnail image indicating the path on a partial region of a screen using the received data, and change the viewing area of the currently played surround video based on the path included in the received data in response to a third command for selecting the thumbnail image.

In another technical aspect of the present invention, provided herein is a method of controlling a mobile terminal, including playing a surround video including a plurality of viewing areas as a first viewing area in a manner of playing the surround video as a second viewing area in response to a first command for changing a viewing area, receiving data including a path of the viewing area from a preset external device or a preset external server in response to a second command, displaying a thumbnail image indicating the path on a partial region of a screen using the received data, and changing the viewing area of the currently played surround video based on the path included in the received data in response to a third command for selecting the thumbnail image.

Technical solutions obtainable from the present invention may be non-limited by the above mentioned solutions. And, other unmentioned solutions can be clearly understood from the following description by those having ordinary skill in the technical field to which the present invention pertains.

Advantageous Effects

Effects of a mobile terminal and control method thereof according to the present invention are described as follows.

According to at least one of embodiments of the present invention, it is advantageous in that a surround video can be played along a path of a viewing area configured by a different user.

According to at least one of embodiments of the present invention, it is advantageous in saving a path of a viewing area of a surround video displayed in a mobile terminal to a memory and enabling the saved path to be shared with a different user.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 5 is a diagram to describe a surround video.

FIG. 6 is a diagram to describe one example of a method of displaying a surround video as a specific viewing area in response to a command corresponding to a viewing area change in a mobile terminal according to one embodiment of the present invention.

FIG. 7 is a diagram to describe one example of a method of selecting a path of a viewing area in a mobile terminal according to one embodiment of the present invention.

FIG. 8 and FIG. 9 are diagrams to describe examples of a method of changing a viewing area of a surround video based on a preset path in a mobile terminal according to one embodiment of the present invention.

FIG. 13 and FIG. 14 are diagrams to describe examples of a method of displaying a history of a viewing area on a prescribed region on a screen in a mobile terminal according to one embodiment of the present invention.

FIG. 15 is a diagram to describe one example of a method of pairing or deleting information containing a history of a viewing area in a mobile terminal according to one embodiment of the present invention.

FIG. 16 is a diagram to describe one example of a method of displaying a path of a viewing area received from a preset external server or a preset external device together with a current viewing area in response to a specific command in a mobile terminal according to one embodiment of the present invention.

FIG. 17 is a diagram to describe one example of a method of changing a current viewing area while displaying a path of a viewing area received from a preset external server or a preset external device in a mobile terminal according to one embodiment of the present invention.

FIG. 21 is a diagram to describe one example of a method of if a viewing area is changed from a currently displayed viewing area into a different viewing area, saving information corresponding to a history of the viewing area to a memory in a mobile terminal according to one embodiment of the present invention.

FIG. 22 is a diagram to describe one example of a method of playing a surround video at a specific timing using information corresponding to a history stored in a memory in a mobile terminal according to one embodiment of the present invention.

FIG. 23 is a diagram to describe one example of a method of changing a viewing area using information corresponding to a history stored in a memory in a mobile terminal according to one embodiment of the present invention.

BEST MODE FOR INVENTION

Figure 1A:
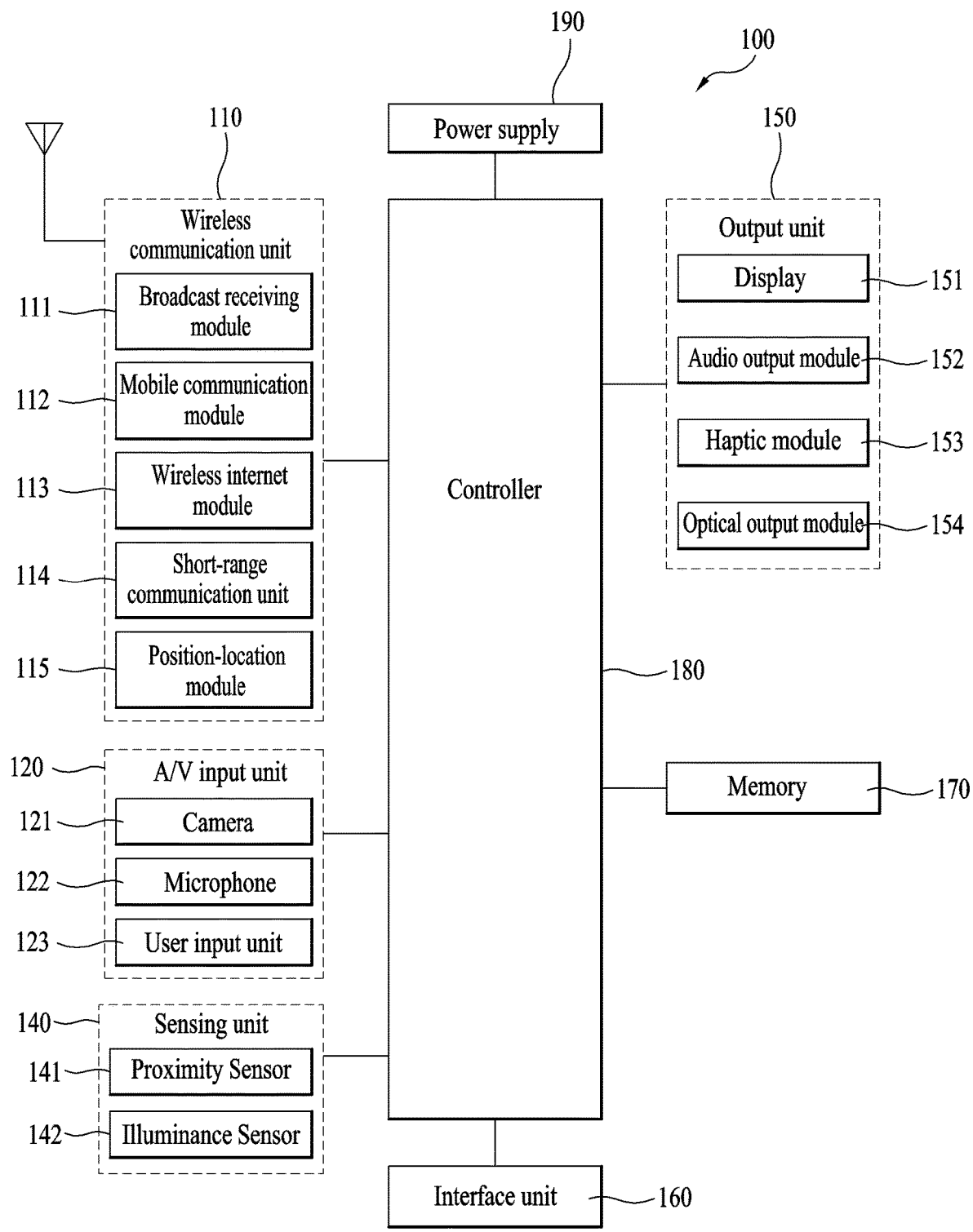
FIG. 1A is a block diagram to describe a mobile terminal related to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with or to" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
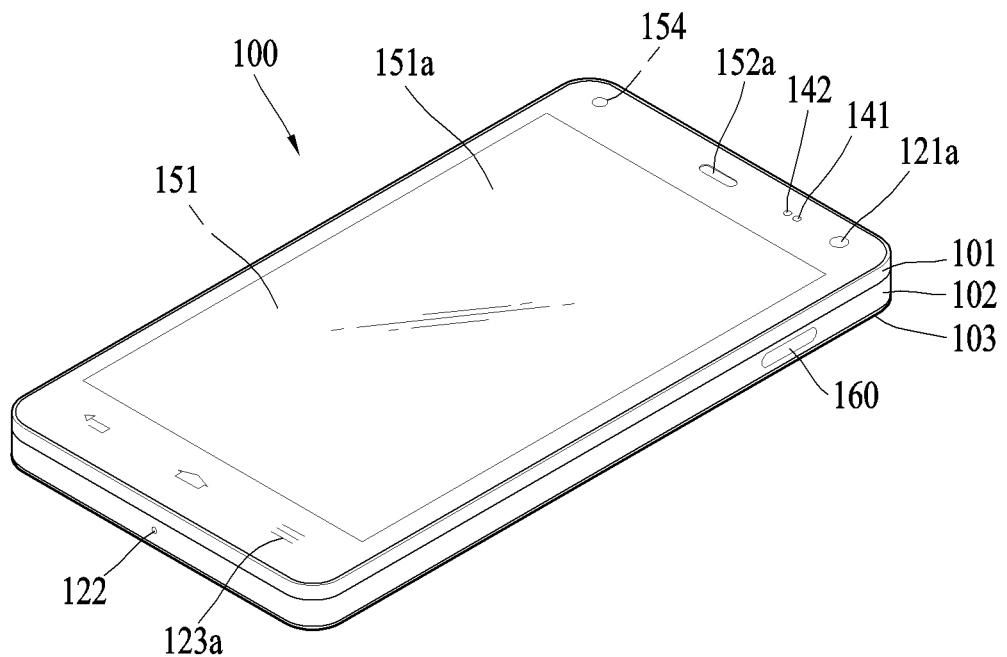
FIGS. 1B and 1C are conceptual diagrams for one example of a mobile terminal related to the present invention, viewed from different directions.
Figure 1C:
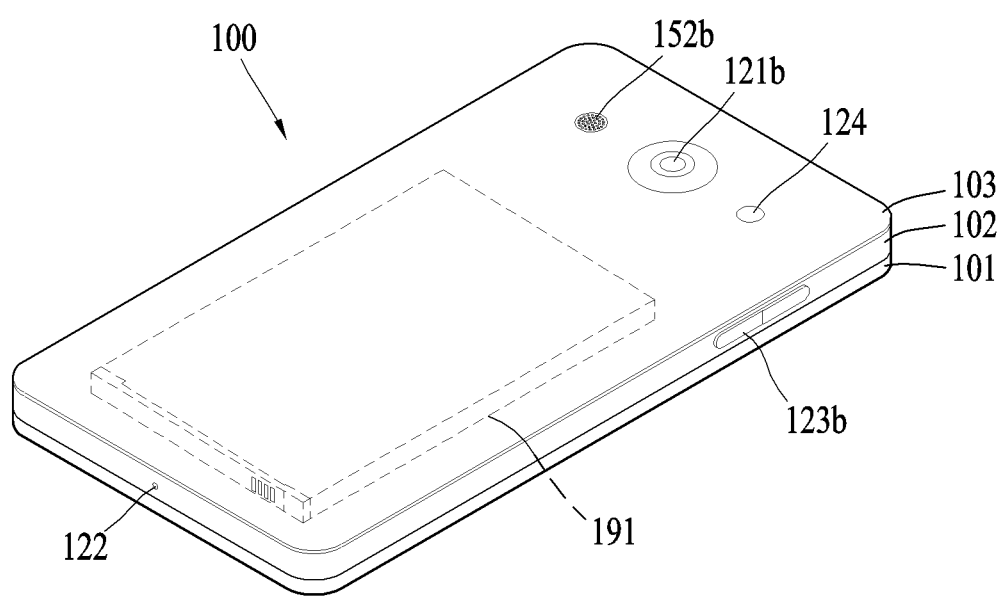

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a position location module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs saved in the memory 170, thereby processing or providing a user with appropriate information and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast management server generates a broadcast signal and/or broadcast-related information, and receives the transmitting server or the generated broadcasting signal and/or broadcasting related information, may indicate a server that transmits to a terminal. The broadcast signal includes a TV broadcast signal, a radio broadcast signal, and a data broadcast signal, as well as a TV broadcast signal or it is also possible to include a broadcast signal in which a data broadcast signal is combined with a radio broadcast signal.

The broadcast signal may be encoded according to at least one of the technical standards (or broadcasting system, for example, ISO, IEC, DVB) for transmitting and receiving digital broadcast signals. And the broadcast receiving module 111 can receive the digital broadcast signal using a method conforming to the technical standards defined in the technical standards.

The broadcast-related information may indicate a broadcast channel, a broadcast program, or information related to broadcast service provider. The broadcast-related information can also be provided through a mobile communication network. In this case, the mobile communication module 112 may receive the broadcast-related information.

The broadcast-related information includes, for example, a DMB (Digital Multimedia Broadcasting), EPG (Electronic Program Guide) or an ESG (Electronic Service Guide) of a DVB-H (Digital Video Broadcast-Handheld). The broadcast signal and/or broadcast related information received through the broadcast receiving module 111 may be stored in the memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA). Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The position-location module 115 is generally configured to detect, calculate, derive or otherwise identify a position of the mobile terminal. As an example, the position-location module 115 includes a Global Position System (GPS) module, a Wi-Fi module, or both. If desired, the position-location module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

Generally, 3D stereoscopic images are composed of left image (left eye image) and right image). According to the way in which left and right images are combined into three-dimensional stereoscopic images, a top-down method in which left and right images are arranged vertically in one frame, method, a left-to-right (L-to-R) side-by-side method in which left and right images are arranged left and right in one frame, board (checker board) method, the left image and the right image are alternately arranged in a column unit or a row unit interlaced, and left and right images by time sequential (frame-by-frame) method.

In addition, the 3D thumbnail image is obtained from the left and right images of the original image frame a left-image thumbnail and a right-image thumbnail, respectively, and as they are combined and can be generated as one image. Generally, a thumbnail is a reduced image or a reduced still image. The generated left image thumbnail and right image the thumbnail is displayed on the screen by a depth corresponding to the parallax between the left and right images by displaying the difference between the left and right distances, it is possible to exhibit stereoscopic spatial feeling.

The left and right images required for the implementation of the three-dimensional image are processed by the stereoscopic processing unit and can be displayed on the stereoscopic display unit. The stereoscopic processing unit displays 3D images and the image of the extension point of time) from the left image and the right image, or a 2D image is inputted and converted into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 can receive external power or provide internal power and supply the appropriate power required for operating respective elements and components included in the mobile terminal 100. The power supply unit 190 may include a battery, which is typically rechargeable or be detachably coupled to the terminal body for charging.

Also, the power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Also, various embodiments can be implemented in the computer and similar recording materials using software, hardware and the combination of software and hardware.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the $1^{st}$ audio output unit 152a, the $2^{nd}$ audio output unit 152b, the proximity sensor 141, the illumination sensor 142, the light output unit 154, the $1^{st}$ camera 121a, the $2^{nd}$ camera 121b, the $1^{st}$ manipulating unit 123a, the $2^{nd}$ manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

In the figure, the first operation unit 123a is a touch key, the invention is not limited thereto. For example, the first operation unit 123a a mechanical key, or a combination of a touch key and a touch key.

The contents input by the first and second operation units 123a and 123b are variously set can be. For example, the first operation unit 123a may issue a command such as a menu, a home key, a cancel, and the second operation unit 123b receives the first sound output from the first or second sound output unit 152a or 152b the size of the sound to be output, and the switch to the touch recognition mode of the display unit 151 can be input.

The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, in the present invention, it can be displayed using a flexible display. In the following, this will be discussed in more detail with attached drawings.

Figure 2:
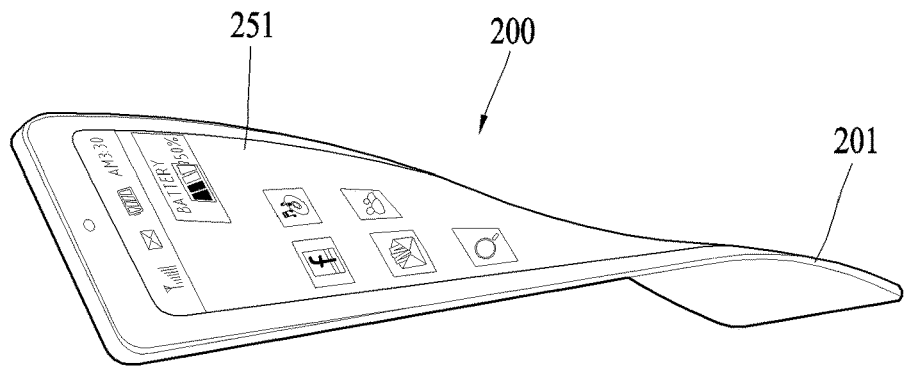
FIG. 2 is a conceptual diagram to describe another example of a deformable mobile terminal 200 according to the present disclosure.

FIG. 2 is a conceptual view to describe another example of a deformable mobile terminal 200 according to the present invention.

Referring to FIG. 2, a display unit 251 may be configured deformable in response to an external force. This deformation may include at last one of curving, bending, folding, twisting, rolling, and combinations thereof. The deformable display unit 251 may be named "flexible display unit". In particular, the flexible display unit 251 may include a general flexible display, an electronic paper (also known as e-paper), and a combination thereof. In general, a mobile terminal 200 may be configured to include the same or similar features of the former mobile terminal 100 shown in FIGS. 1A to 1C.

Generally, a flexible display means a display that is light-weighted and non-fragile in a manner of being fabricated on a thin and flexible substrate having such properties of paper as curving, bending, folding, twisting, and rolling while maintaining the properties of an existing flat panel display.

The e-paper may be used to refer to a display technology that employs the properties of a general ink. The e-paper is different from the existing flat panel display in using reflective light. The e-paper is generally understood as changing displayed information by electrophoresis using twist balls or capsules.

In a state that the flexible display unit 251 is not deformed (for example, a state that the flexible display unit 251 has an infinite radius of curvature, referred to as a $1^{st}$ state), a display region of the flexible display unit 251 becomes a flat surface. In a state that the flexible display unit 251 is deformed from the $1^{st}$ state by an external force (for example, a state that the flexible display unit 251 has a finite radius of curvature, referred to as a $2^{nd}$ state), the display region may become a curved surface or a bent surface. As illustrated, information displayed in the second state may include a visual information outputted through the curved surface. The visual information may be implemented in a manner that light emission of each unit pixel (sub-pixel) arranged in a matrix configuration is controlled independently. In this case, the unit pixel denotes an elementary unit for representing a single color.

The flexible display unit 251 may enter not a flat state but a curved state (for example, a vertically curved state, a horizontally curved state, etc.) in the 1$^{st}$ state. In doing so, if an external force is applied to the flexible display unit 251, the flexible display unit 251 may be deformed into a flat state (or a less curved state) or a more curved state.

If desired, the flexible display unit 251 may embody a flexible touchscreen by being combined with a touch sensor. If a touch is applied to the flexible touchscreen, the controller 180 (cf. FIG. 1A) can perform a control in response to the touch input. The flexible touchscreen may be configured to sense a touch input not only in the 1$^{st}$ state but also in the 2$^{nd}$ state.

Meanwhile, the mobile terminal 200 according to the modified example may include a deformation sensing means for sensing the deformation of the flexible display unit 251. The deformation sensing means may be included in the sensing unit 140 shown in FIG. 1A.

The deformation sensing means is provided to the flexible display unit 251 or the case 201 to sense information related to the deformation of the flexible display unit 251. Examples of such information related to the deformation of the flexible display unit 251 may include a deformed direction of the flexible display unit 251, a deformed degree of the flexible display unit 251, a deformed position of the flexible display unit 251, a deformed time of the flexible display unit 251, an acceleration for restoring the deformed flexible display unit 251, and the like. Besides, the information may include various kinds of information that can be sensed owing to the curving of the flexible display unit 251.

The controller 180 can change the information displayed on the flexible display unit 251 or generate a control signal for controlling a function of the mobile terminal 200, based on the information related to the deformation of the flexible display unit 251. Such information is typically sensed by the deformation sensing means.

The mobile terminal 200 according to the modified example may include a case 201 for accommodating the flexible display unit 251. The case 201 can be configured deformable together with the flexible display unit 251 in consideration of the property of the flexible display unit 251.

A battery (not shown in the drawing) provided to the mobile terminal 200 may be configured deformable by an external force together with the flexible display unit 251 in consideration of the property of the flexible display unit 251. In order to embody such a battery, it is able to employ a stack and folding scheme of stacking battery cells on each other.

The state deformation of the flexible display unit 251 is non-limited by the case of applying the external force. For example, the flexible display unit 251 can be deformed into the 2$^{nd}$ state in response a command given by a user or application when the flexible display unit 251 is in the 1$^{st}$ state.

Beyond using a mobile terminal grabbed with a user's hand, the mobile terminal may extend to a wearable device that is wearable on a user body. Examples of the wearable device include a smart watch, a smart glass, a head mounted display (HMD), and the like. Examples of the mobile terminal extending to the wearable devices shall be described as follows.

First of all, a typical wearable device can exchange data with (or interwork with) another mobile terminal 100. The short-range communication module 114 can sense or recognize a nearby wearable device capable of communicating with the mobile terminal 100. Moreover, if the sensed wearable device is a device authenticated to communicate with the mobile terminal 100, the controller 180 may transmit at least one portion of the data processed in the mobile terminal 100 to the wearable device via the short-range communication module 114, for example. Hence, a user can use the data processed in the mobile terminal 100 through the wearable device. For example, when an incoming call is received by the mobile terminal 100, the user can answer the incoming call through the wearable device. When a message is received by the mobile terminal 100, the user can check the received message through the wearable device.

Figure 3:
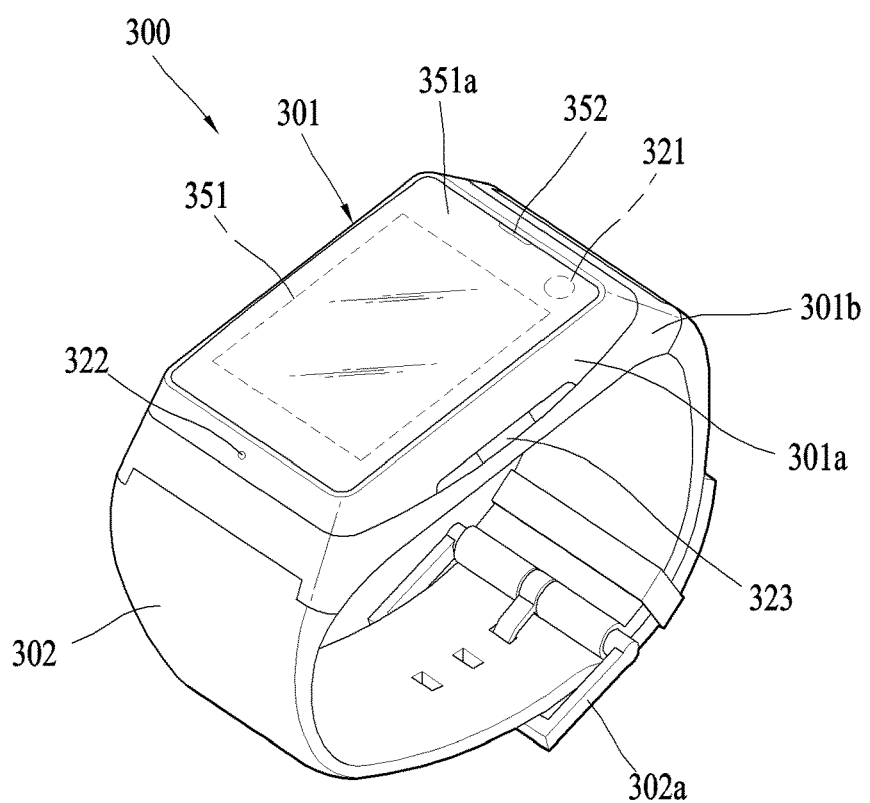
FIG. 3 is a perspective diagram for one example of a watch type mobile terminal 300 related to another embodiment of the present invention.

FIG. 3 is a perspective diagram for one example of a watch type mobile terminal 300 related to another embodiment of the present invention.

Referring to FIG. 3, a mobile terminal 300 of a watch type may include a main body 301 having a display unit 351 and a band 302 connected to the main body 301 to be wearable on a wrist. In general, the mobile terminal 300 may be configured to include features that are the same or similar to those of the former mobile terminal 100 shown in FIGS. 1A to 1C.

The main body 301 may include a case forming a certain appearance or exterior. As illustrated, the case may include a 1$^{st}$ case 301a and a 2$^{nd}$ case 301b configured to cooperatively provide an inner space for accommodating various electronic components therein, by which the present invention is non-limited. For instance, a single case is configured to provide the inner space, thereby embodying the mobile terminal 300 of a uni-body type.

The watch type mobile terminal 300 is configured to perform wireless communication, and an antenna for the wireless communication can be installed in the main body 301. It is able to expand performance of the antenna using the case. For example, a case containing a conductive material is electrically connected to the antenna to extend a ground region or a radiation region.

The display unit 351 is disposed on the front side of the main body 301 so as to output information. The display unit 351 is provided with a touch sensor so as to be embodied into a touchscreen. As illustrated, a window 351a of the display unit 251 is mounted on the 1$^{st}$ case 301a to form a front surface of the terminal body together with the 1$^{st}$ case 301a.

The main body 301 may be provided with an audio output unit 352, a camera 321, a microphone 322, a user input unit 323 and the like. In case that the display unit 351 is embodiment into the touchscreen, it can function as a user input unit 323. Hence, a separate key may not be provided to the main body 301.

The band 302 is configured to be worn on a wrist by enclosing the wrist. And, the band 302 may be formed of a flexible material for facilitating the wearing of the device. As one example, the band 302 may be made of leather, rubber, silicon, synthetic resin, and/or the like. As the band 302 is configured detachable from the main body 301, the band 302 may be substituted with various types of bands according to a user's preference.

Meanwhile, the band 302 may be used to expand the performance of the antenna. For example, a ground extending portion (not shown in the drawing) for extending a ground region by being electrically connected to the antenna may be built in the band 302.

The band 302 may include a fastener 302a. The fastener 302a may be embodied into a buckle type, a snap-fit hook structure, a Velcro® type, and/or the like. The fastener 302a may include a retractile section or material. According to the example shown in the present drawing, the fastener 302a is embodied into the buckle type.

Figure 4:
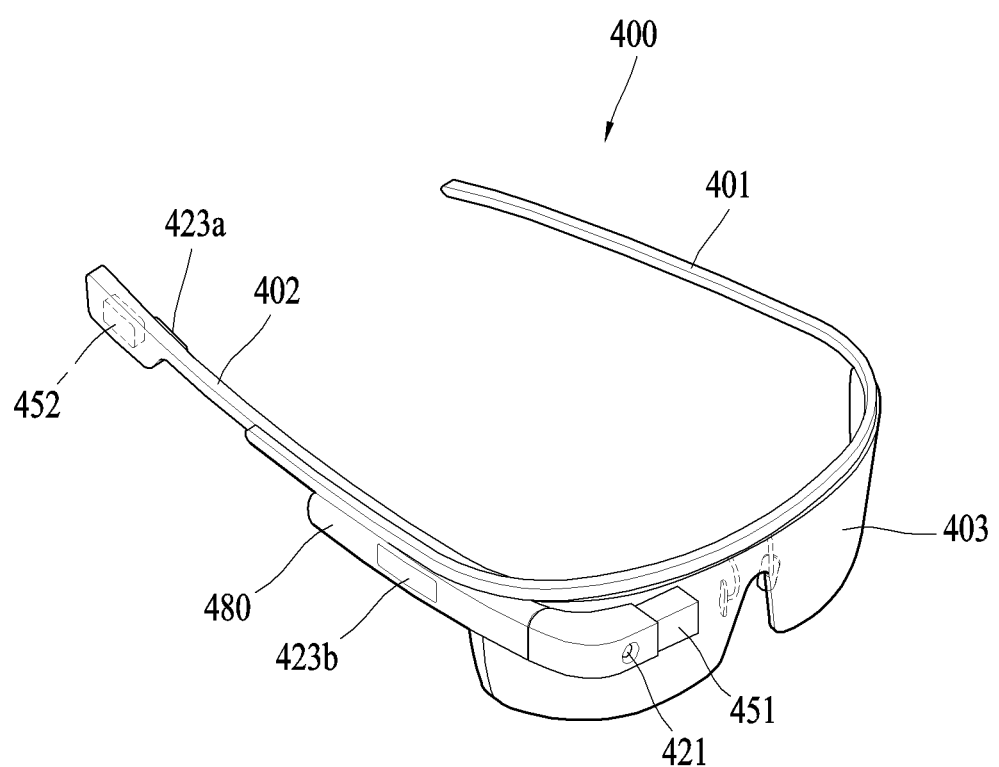
FIG. 4 is a perspective diagram for one example of a glass type mobile terminal 400 related to further embodiment of the present invention.

FIG. 4 is a perspective diagram for one example of a glass type mobile terminal 400 related to further embodiment of the present invention.

The glass type mobile terminal 400 is configured wearable on a head of a human body. To this end, the glass type mobile terminal 400 may include a frame unit (e.g., a case, a housing, etc.). The frame unit may be formed of a flexible material to be easily wearable. According to the example shown in the drawing, the frame unit of the mobile terminal 400 includes a $1^{st}$ frame 401 and a $2^{nd}$ frame 402, each of which can be made of a different material. In general, the mobile terminal 400 may have the same or similar features of the former mobile terminal 100 shown in FIGS. 1A to 1C.

The frame unit may be supported by the head and provides a space for mounting various components therein. As illustrated, electronic components such as a control module 480, an audio output unit 452 and the like may be installed in the frame unit. And, a lens 403 configured to cover at least one of the left and the right eye may be detachably installed in the frame unit.

The control module 480 is configured to control various electronic components provided to the mobile terminal 400. It may be appreciated that the control module 480 has the configuration corresponding to the aforementioned controller 180. According to the example shown in the present drawing, the control module 480 is installed in the frame unit on one side of the head, by which a location of the control module 480 is non-limited.

The display unit 451 may be embodied into a head mounted display (HMD). The HMD refers to a display system for directly projecting an image in front of user's eyes in a manner of being mounted on the head. In order to provide an image directly in front of the user's eyes, when the user wears the glass type mobile terminal 400, the display unit 451 may be disposed to correspond to at least one of the left eye and the right eye. According to the example shown in the present drawing, the display unit 451 is situated at a location corresponding to the right eye in order to output an image toward the user's right eye.

The display unit 451 may project an image into the user's eye using a prism. And, the prism may be formed to be optically transparent so that the user can watch the projected image and a general visual field (i.e., a range viewed by a user through the corresponding eye) in front of the user.

Thus, the image outputted through the display unit 451 may be viewed in a manner of overlapping the general visual field. The mobile terminal 400 can provide AR (Augmented Reality) by overlaying a virtual image on a real image or a background using the property of the display.

The camera 421 may be disposed adjacent to at least one of the left eye and the right eye to photograph an image in front. Since the camera 421 is situated adjacent to the eye, the camera 421 can obtain an image of a scene currently viewed by the user.

According to the example shown in the preset drawing, the camera 421 is provided to the control module 480, by which the present invention is non-limited. Alternatively, the camera 421 may be installed in the frame unit. Alternatively, a plurality of cameras may be provided to obtain stereoscopic images.

The glass type mobile terminal 400 may include user input units 423a and 423b manipulated to receive an input of a control command. The user input units 423a and 423b may employ any manners (e.g., touch, push, etc.) corresponding to a tactile manner in which a user can perform manipulations by experiencing a tactile sense. According to the example shown in the present drawing, the user input units 423a and 423b of the push input manner and the touch input manner are provided to the frame unit and the control module 480, respectively.

Moreover, the mobile terminal 400 may further include a microphone (not shown in the drawing) for receiving an input of a sound and then processing the input sound into electric audio data and an audio output module 452 for outputting audio. The audio output module 452 may be configured to transfer audio in a general audio output manner or an osteoconductive manner. In case that the audio output unit 452 is embodied in the osteoconductive manner, when the user wears the mobile terminal 400, the audio output unit 452 comes in close contact with a user's head and vibrates user's skull to transfer audio.

A communication system that can be embodied through the mobile terminal 100 according to the present invention is described in detail as follows.

First of all, a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

For clarity, the following description is limited to CDMA only. Yet, it is apparent that the present invention applies equally to other system types including not only CDMA wireless communication system but also OFDM (Orthogonal Frequency Division Multiplexing) wireless communication system.

The CDMA wireless communication system generally includes at least one terminal 100, at least one base station (BS) (possibly named Node B or Evolved Node B), at least one or more base station controllers (BSCs), and a mobile switching center (MSC). The MSC is configured to be connected to a conventional Public Switched Telephone Network (PSTN) and the BSCs. The BSCs are coupled to the base stations to pair with via backhaul line. The backhaul line may be provided in accordance with at least one of E1/T1, ATM, IP, PPP, Frame Relay, HDSL, ADSL, and xDSL. Hence, a plurality of BSCs can be included in the CDMA wireless communication system.

Each of a plurality of BSs (base stations) may include at least one or more sectors. And, each of the sectors may include an omni-directional antenna or an antenna indicating a specific direction radially away from the BS. Alternatively, each of the sectors may include two or more antennas of various types. Each of the BSs may be configured to support a plurality of frequency assignments. And, each of a plurality of the frequency assignments may have a specific spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In this case, the term "base station" may be used to refer collectively to one BSC and at least one BS. The base stations may indicate "cell site." Moreover, each of a plurality of sectors for a specific BS may be referred to as a plurality of cell sites.

A broadcasting transmitter (BT) transmits a broadcast signal to the mobile terminals 100 operating within the system. The broadcast receiving module 111 shown in FIG. 1A is typically configured inside the mobile terminal 100 to receive broadcast signals transmitted by the BT.

Moreover, Global Positioning System (GPS) for locating the position of the mobile terminal 100 may cooperate with the CDMA wireless communication system. The satellite 300 helps to obtain a location of the mobile terminal 100. Useful position information may be obtained with greater or fewer satellites than two. In doing so, it is able to trace a location of the mobile terminal 100 using all technologies capable of tracing locations or positions as well as the GPS tracking technology. If desired, at least one of the GPS satellites may be in charge of satellite DMB transmissions optionally or additionally.

The location information module 115 provided to the mobile terminal is generally configured to detect, calculate, or otherwise identify a position or location of the mobile terminal. As a representative example, the location information module 115 may include a Global Position System (GPS) module, a Wi-Fi (wireless fidelity) module, or both. If desired, the location information module 115 may alternatively or additionally function as any of the other modules of the wireless communication unit 110 to obtain data related to the position or location of the mobile terminal.

The GPS module 115 accurately calculates current 3D location information according to latitude, longitude and latitude by measuring an accurate time and distance from three or more satellites and then applying trigonometry to the calculated informations. Currently, a method of acquiring distance and time information from three satellites and performing error correction with a single satellite is popularly used. Moreover, the GPS module 115 can acquire speed information by continuing to calculate a real-time current location. Yet, accuracy of a measured location or position of the mobile terminal may be compromised when the mobile terminal is located in such a blind spot of satellite signals as an indoor space or the like. In order to compensate the measured location by GPS system, it is able to use Wi-Fi Positioning System (WPS) and the like.

The Wi-Fi positioning system (WPS) is the location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal 100, a wireless access point (AP) connected to the mobile terminal 100, and a database storing random wireless AP information.

The mobile terminal 100 currently connected to the wireless AP may send a location information request message to the Wi-Fi location determination server.

The Wi-Fi location determination server extracts the information of the wireless AP connected to the mobile terminal 100, based on the location information request message (or signal) of the mobile terminal 100. The information of the wireless AP connected to the mobile terminal 100 may be sent to the Wi-Fi location determination server through the mobile terminal 100, or sent to the Wi-Fi location determination server from the wireless AP.

The information of the wireless AP extracted based on the location information request message of the mobile terminal 100 may include at least one of media access control (MAC) address, service set identification (SSID), received signal strength indicator (RSSI), reference signal received Power (RSRP), reference signal received quality (RSRQ), channel information, privacy, network type, signal strength, noise strength, and the like.

As mentioned in the above description, the Wi-Fi location determination server receives the information of the wireless AP connected to the mobile terminal 100 and may be then able to extract wireless AP information corresponding to the wireless AP connected to the mobile terminal from the pre-established database. In this case, the information of any wireless APs stored in the database may include information such as MAC address, SSID, RSSI, channel information, privacy, network type, latitude and longitude coordinate, building at which the wireless AP is located, floor number, detailed indoor location information (GPS coordinates available), AP owner's address, phone number, and the like. In doing so, in order to remove a mobile AP or a wireless AP provided using an illegal MAC address in the course of a location determining process, the Wi-Fi location determination server may extract only a prescribed number of wireless AP informations in order of high RSSI.

Thereafter, the Wi-Fi location determination server may extract (analyze) location information of the mobile terminal 100 using at least one wireless AP information extracted from the database. By comparing the included information and the received wireless AP information to each other, the location information of the mobile terminal 100 is extracted (or analyzed).

As a method for extracting (or analyzing) the location information of the mobile terminal 100, it is able to utilize a Cell-ID scheme, a fingerprint scheme, a trigonometry scheme, a landmark scheme and the like.

The Cell-ID scheme is used to determine a location of a wireless AP having the largest signal strength among peripheral wireless AP informations collected by a mobile terminal as a location of the mobile terminal. The Cell-ID scheme has advantages as follows. First of app, Implementation of the Cell-ID scheme is minimally complicated. Secondly, the Cell-ID scheme does not require additional costs. Thirdly, location information can be rapidly acquired. Yet, the Cell-ID scheme has the disadvantage in that the precision of positioning may fall below a desired threshold when the installation density of wireless APs is low.

The fingerprint scheme is a method of estimating a location through a signal strength information transmitted by a mobile terminal based on information collected by selecting a reference location from a service area. In order to use the fingerprint scheme, it is necessary to establish database of propagation characteristics in advance.

The trigonometry scheme is used to calculate a location of a mobile terminal based on a distance between coordinates of at least three wireless APs and the mobile terminal. In order to measure the distances between the mobile terminal and the wireless APs, signal strength may be converted into distance information, or Time of Arrival (ToA), Time Difference of Arrival (TDoA), Angle of Arrival (AoA) and the like may be used.

The landmark scheme is used to measure a location or position of a mobile terminal using a known landmark transmitter.

In addition to the above-listed schemes, various algorithms may be used to extract (or analyze) location information of a mobile terminal.

Such extracted location information may be transmitted to the mobile terminal 100 through the Wi-Fi location determination server, whereby the mobile terminal can acquire the location information.

The mobile terminal 100 can acquire location information by being connected to at least one wireless AP. In doing so, the number of wireless APs required for acquiring the location information of the mobile terminal 100 may be variously changeable depending on a wireless communication environment in which the mobile terminal 100 is situated.

As mentioned in the foregoing description with reference to FIG. 1A, short-range communication techniques such as Bluetooth™, Radio Frequency Identification (RFID), Infrared Data Association (IrDA), Ultra Wideband (UWB), Zig-Bee, Near Field Communication (NFC), Wireless USB (Wireless Universal Serial Bus) and the like may apply to the mobile terminal according to the present invention.

Among the short-range communication technologies, NFC module provided to the mobile terminal supports an inter-terminal non-contact type short-range wireless communication in a distance of about 10 cm range. The NFC module may operate in one of a card mode, a reader mode and a P2P mode. The mobile terminal 100 may further include a security module for storing card information in order to for the NFC module in the card mode. In this case, the security module may include one of a physical medium such as Universal Integrated Circuit Card (UICC) (e.g., Subscriber Identification Module (SIM), Universal SIM (USIM), etc.), Secure micro SD, a sticker and the like, or a logical medium (e.g., embedded Secure Element (SE), etc.) embedded in the mobile terminal. Data exchange may be performed between the NFC module and the security module based on Single Wire Protocol (SWP).

In a case that the NFC module operates in the card mode, the mobile terminal may externally transfer card information saved like a traditional IC card. In particular, if a mobile terminal storing card information of a payment card (e.g., a credit card, a bus card, etc.) approaches a card reader, a short-range mobile payment may be processed. If a mobile terminal storing card information of an entrance card approaches an entrance card reader, an entrance approval procedure may start. A card such as a credit card, a traffic card, or an entrance card may be loaded on the security module in the form of applet, and the security module may store card information on the loaded card. In this case, the card information of the payment card may include at least one of a card number, a remaining amount, a use history, and the like. The card information of the entrance card may include at least one of a user's name, a user's number (e.g., a user's student number, a user's staff number, etc.), an entrance history, and the like.

In case that the NFC module operates in the reader mode, the mobile terminal can read data from an external tag. In doing so, the data received from the external tag by the mobile terminal may be coded in NFC Data Exchange Format defined by NFC Forum. And, the NFC Forum generally defines four record types. In particular, the NFC Forum defines four Record Type Definitions (RTDs) such as Smart Poster, Text, Uniform Resource Identifier (URI), General Control and the like. If the data received from the external tag is a smart poster type, the controller can run a browser (e.g., Internet browser, etc.). If the data received from the external tag is a text type, the controller can run a text viewer. If the data received from the external tag is a URI type, the controller can run a browser or make a phone call. If the data received from the external tag is a general control type, the controller can execute an accurate operation in accordance with control contents.

In case that the NFC module operates in the P2P (Peer-to-Peer) mode, the mobile terminal can perform P2P communication with another mobile terminal. In this case, Logical Link Control Protocol (LLCP) can apply to the P2P communication. For the P2P communication, connection may be created between one mobile terminal and another mobile terminal. In this case, the connection may be categorized into a connectionless mode terminated after switching a single packet or a connection-oriented mode for exchanging packets consecutively. Through the P2P communication, data such as an electronic type business card, a contact information, a digital photo, a URL and the like, setup parameters for Bluetooth connection, Wi-Fi connection, etc. can be exchanged. Yet, the P2P mode can be effectively utilized in exchanging data in small size because an available distance for the NFC communication is relatively short.

Embodiments related to a controlling method implemented in the above-configured mobile terminal shall be described in more detail with reference to the accompanying drawings. It is understood by those skilled in the art that the present features can be embodied in several forms without departing from the characteristics thereof.

In the following description, embodiments of the present specification shall be described by taking the mobile terminal 100 shown in FIG. 1A as one example. Yet, it is a matter of course that a mobile terminal according to one embodiment of the present invention can be embodied with the mobile terminals 200, 300 and 400 shown in FIGS. 2 to 4.

According to the present invention, a mobile terminal can play an image captured through a plurality of cameras. In this case, the image played by the mobile terminal may include a surround video that is shot based on a plurality of cameras.

With respect to the present invention, a video image captured through a plurality of cameras may be a surround video. And, the surround video may contain a plurality of viewing areas. Here, the viewing area may include an area currently displayed through the display unit 151 in the whole area of the surround video.

FIG. 5 is a diagram to describe a surround video.

An image captured through a plurality of cameras enables a wide-angle shooting that covers an angle wider than that of an image captured through a single camera.

For example, as shown in FIG. 5(a), in case of using two cameras 510-1 and 510-2, of which view angle is 'a', it can bring about the same effect as using a camera having a maximum view angle '2a'.

If the number of cameras is raised, it may bring about the same effect as having a camera of which view angle is 360° centering on a prescribed axis.

For example, as shown in FIG. 5(b), if a plurality of cameras 520-1 to 520-6 are disposed in a ring shape, it can bring about the same effect as having a camera of which view angle is 360° centering on a prescribed axis.

An image obtained through a plurality of cameras shown in FIG. 5(b) can be diagrammatized into a stereoscopic figure. For example, an image captured through 6 cameras can be diagrammatized into a shape of a cylinder or a hexagonal column. Here, a lateral side of the hexagonal column may correspond to a shot image captured by a plurality of the cameras.

Like the example shown in FIG. 5(b), if a plurality of cameras are disposed in a ring shape, it is able to obtain an image of omnidirectional shots with reference to a single center axis. If the number of cameras is further increased, it may be able to obtain an image of omnidirectional shots with reference to each of a plurality of center axes.

Like the example shown in FIG. 5(c), if cameras are disposed in a globular shape, an image obtained through a plurality of cameras can be logically diagrammatized into a polyhedron or globe shape.

While a surround video is played, the controller 180 can control a partial viewing area to be outputted through the display unit 151 only. A currently displayed image may be a specific one of a plurality of viewing areas included in the surround video.

According to one embodiment of the present invention, in response to a viewing area change command, the controller 180 can play a surround video as a specific viewing area. This is described in detail with reference to FIG. 6.

FIG. 6 is a diagram to describe one example of a method of displaying a surround video as a specific viewing area in response to a command corresponding to a viewing area change in a mobile terminal according to one embodiment of the present invention. For clarity of the following description with reference to FIG. 6, as shown in FIG. 5(*b*), a surround video is assumed as diagrammatized into a hexagonal column shape.

While a specific viewing area of a surround video is displayed, if a command for changing a viewing area is received, the controller 180 can change the displayed viewing area into a viewing area corresponding to the command.

For example, referring to FIG. 6(*a*), while a surround video is played as a prescribed viewing area, when a user input of dragging to move a pointer touching the display unit 151 in a prescribed direction is detected, the controller 180 can play the surround video by changing a viewing area 610 in a direction opposite to a direction of dragging to move the pointer (or, a drag moving direction of the pointer). FIG. 6(*a*) shows that the viewing area 610 moved in a direction opposite to the drag moving direction of the pointer.

For another example, referring to FIG. 6(*b*), while a surround video is played as a prescribed viewing area, the controller 180 detects a motion of the mobile terminal and controls the viewing area 610 to move in response to the detected motion. FIG. 6(*b*) shows that the viewing area 610 has moved in the same moving direction of the mobile terminal.

Namely, the controller 180 controls the sensing unit 140 to detect a motion of the mobile terminal. If there is no detected motion, the controller 180 plays the surround video as a representative viewing area. If the detected motion exists, the controller 180 can play the surround video as a viewing area changed in response to the motion. Here, the representative viewing area may include a viewing area configured for each play timing point of the surround video by a user who shot the surround video.

Meanwhile, according to one embodiment of the present invention, in response to a specific command, the controller 180 can receive data containing a path of a viewing area from an external device or an external server and control the display unit 151 to display a thumbnail image corresponding to the path. This is described in detail with reference to FIG. 7.

FIG. 7 is a diagram to describe one example of a method of selecting a path of a viewing area in a mobile terminal according to one embodiment of the present invention. With respect to FIG. 7, contents redundant with the former description with reference to FIG. 5 and FIG. 6 shall not be described again and the following description shall be made by focusing on differences.

According to one embodiment of the present invention, the controller 180 can control the display unit 151 to display a specific viewing area of a surround video containing a plurality of viewing area.

Particularly, the controller 180 displays the surround video as a representative viewing area. And, in response to a first command for changing a viewing area, the controller 180 can play the surround video as a viewing area corresponding to the first command.

For example, the first command may include a touch input corresponding to a command for changing a viewing area. Or, the first command may include a command for changing a viewing area in response to a motion of the mobile terminal 100.

Here, the representative viewing area may include a viewing area preset by a producer of the surround video for each viewing timing point of the surround video.

Meanwhile, the controller 180 can control the display unit 151 to display a GUI (graphical user interface) related to a path selection of a viewing area in response to a specific command.

For example, referring to FIG. 7(*a*), the specific command may include a touch command of touching a random point of a right edge on a screen and then dragging it in a specific direction (e.g., a left direction), in a state that the surround video is played as the specific viewing area.

Particularly, referring to FIG. 7(*b*), the controller 180 can control the display unit to display the specific viewing area of the surround video and the GUI on a first region 710 and a second region 720 of the surround video, respectively.

Here, the GUI displayed on the second region 720 may include at least one of a first indicator 810 corresponding to a function of freely changing a viewing area, a second indicator 820 corresponding to a function of recording a path of a viewing area, and a thumbnail image 831/832 indicating a path of a viewing area set by a different user.

If a user selects the first indicator 810, the user can freely view the surround video. This will be described in detail with reference to FIG. 11 later.

If the user selects the second indicator 820, the user can save a viewing area of a surround video, which is to be played in the future, to the memory 170. This will be described in detail with reference to FIG. 12 later.

Meanwhile, the controller 180 can control the wireless communication unit 110 to receive data containing a path of a viewing area from a preset external device or a preset external server in response to the specific command. And, the controller 180 can control the display unit 151 to display the thumbnail images 831 and 831 on a partial region (more particularly, a partial region within GUI) on the screen using the data.

For example, if receiving a first data containing a first path of a viewing area and a second data containing a second path of a viewing area from the preset external device or the preset external server, the controller 180 can control the display unit 151 to display a first thumbnail image 831 indicating the first path and a second thumbnail image 832 indicating the second path on the second region 720 of the screen using the first data and the second data.

The preset external device may include an external device transmitting data containing a path of a viewing area to the mobile terminal, as an external device communication-connected to the mobile terminal 100. And, the external server may include an external server in which data containing the path of the viewing area is stored.

The path of the viewing area may include a path in which a viewing area watched by a different user having watched the surround video is recorded by the different user. Namely, the mobile terminal 100 can receive a viewing area for a different user to view the surround video using an external device.

Meanwhile, the thumbnail image 831/832 indicating the path may be received by being contained in the data or include a thumbnail image extracted using the path of the viewing area.

Meanwhile, according to one embodiment of the present invention, if a prescribed one of the displayed thumbnail images is selected, the controller 180 can change a viewing area of a currently played surround video based on a path corresponding to the selected thumbnail image. This is described in detail with reference to FIG. 8 and FIG. 9.

FIG. 8 and FIG. 9 are diagrams to describe examples of a method of changing a viewing area of a surround video based on a preset path in a mobile terminal according to one embodiment of the present invention. With respect to FIG. 8 and FIG. 9, contents redundant with the former description with reference to FIGS. 5 to 7 shall not be described again and the following description shall be made by focusing on differences.

According to one embodiment of the present invention, the controller 180 can control the display unit 151 to display a specific viewing area of a surround video containing a plurality of viewing areas. In doing so, the controller 180 plays the surround video as a representative viewing area, and more particularly, as a viewing area corresponding to a first command in response to a first command for changing a viewing area.

First of all, in response to a second command (cf. FIG. 7(*a*)), the controller 180 controls the wireless communication unit 110 to receive data containing a path of a viewing area from a preset external device or a preset external server and also controls the display unit 151 to display a thumbnail image indicating the path using the received data.

For example, the controller 180 can control the wireless communication unit to receive a first data containing a first path of a viewing area and a second data containing a second path of a viewing area from the preset external device or server.

And, referring to FIG. 8(*a*) and FIG. 9(*a*), the controller 180 can control the display unit 151 to display a first thumbnail image 831 indicating the first path and a second thumbnail image 832 indicating the second path using the received first and second data.

In response to a command for selecting the first thumbnail image 831, the controller 180 can change a viewing area of the currently played surround video based on the first path. In response to a command for selecting the second thumbnail image 832, the controller 180 can change a viewing area of the currently played surround video based on the second path.

For example, referring to FIG. 8(*b*), in response to a touch command of touching the first thumbnail image 831 displayed on a second region 720 [cf. FIG. 8(*a*)], the controller 180 can play the surround video using the first path. Here, the first path may be information on a viewing area of a surround video at each play timing point set by a first user. Namely, a user of the mobile terminal 100 can watch that a viewing area changed according to the first path is displayed.

For another example, referring to FIG. 9(*b*), in response to a touch command of touching the second thumbnail image 832 displayed on a second region 720 [cf. FIG. 9(*a*)], the controller 180 can play the surround video using the second path. Here, the second path is a path different from the first path and may be information on a viewing area of a surround video at each play timing point set by a second user. Namely, a user of the mobile terminal 100 can watch that a viewing area changed according to the second path is displayed.

Meanwhile, according to one embodiment of the present invention, while playing a surround video along a path corresponding to a user-selected thumbnail image, the controller 180 may change a viewing area in response to a user's touch input. This is described in detail with reference to FIG. 10.

Figure 10:
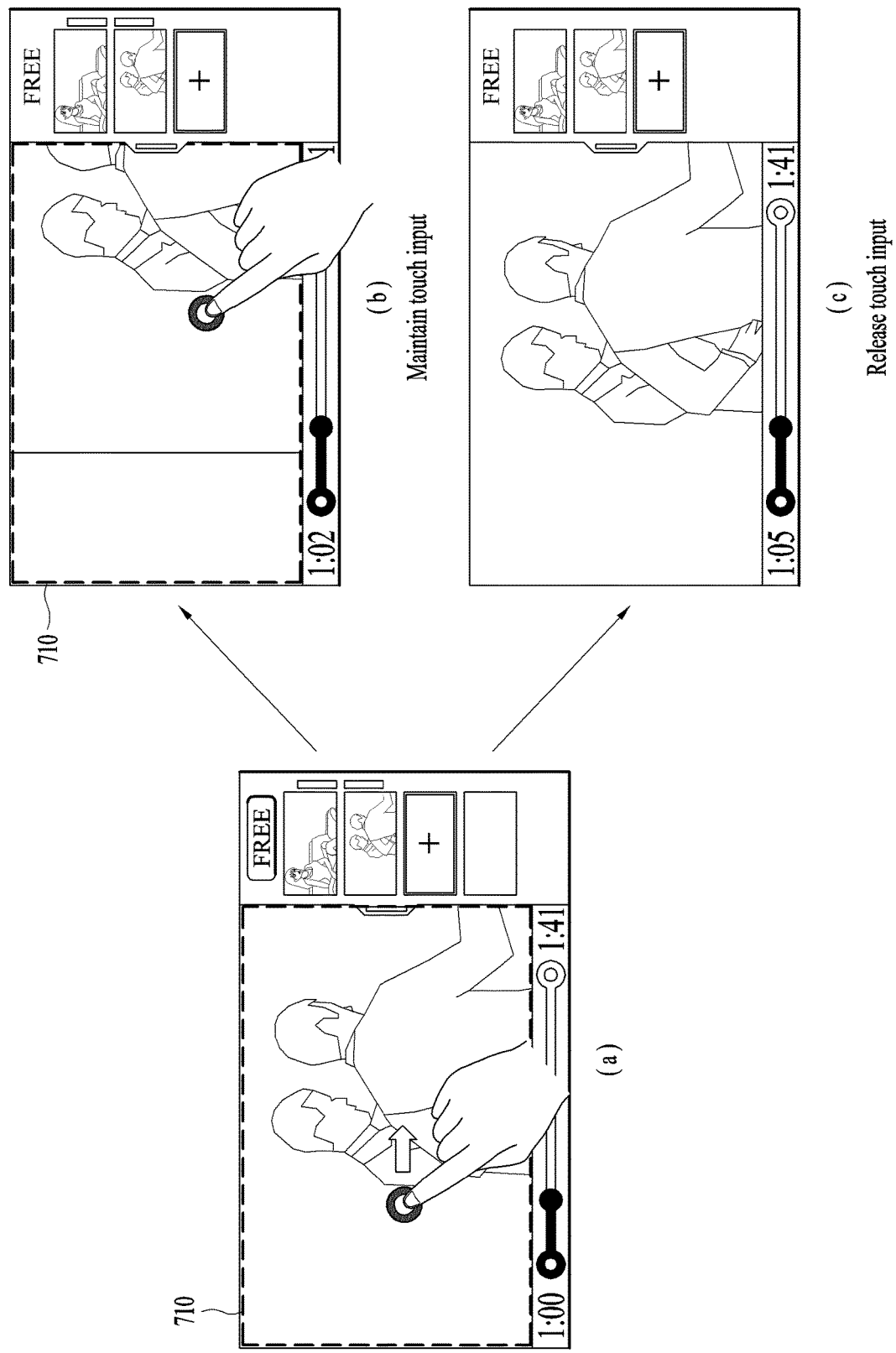
FIG. 10 is a diagram to describe one example of a method of changing a viewing area in the course of playing a surround video along a specific path in a mobile terminal according to one embodiment of the present invention.

FIG. 10 is a diagram to describe one example of a method of changing a viewing area in the course of playing a surround video along a specific path in a mobile terminal according to one embodiment of the present invention. With respect to FIG. 10, contents redundant with the former description with reference to FIGS. 5 to 9 shall not be described again and the following description shall be made centering on differences.

Regarding FIG. 10, the following description is made on the assumption that a viewing area of a surround video is being changed based on a path of a viewing area contained in data received from a preset external device or server.

While changing a viewing area of a surround video based on a specific path, the controller 180 can detect a touch input corresponding to a change of a viewing area.

For example, referring to FIG. 10(*a*), the touch input corresponding to the change of the viewing area may include a touch input of touching a prescribed point within a region (e.g., a first region 710) on which a specific viewing area of the surround video is displayed and the dragging it in a specific direction.

The controller 180 may control the display unit 151 to display a third viewing area corresponding to the touch input in response to the touch input. Here, the third viewing area may be a viewing area that a currently displayed viewing area is changed in a direction opposite to a direction of the touch input (or, in the same direction of the touch input).

Meanwhile, depending on whether the touch input is maintained, the controller 180 can determine whether to continue to display the viewing area corresponding to the touch input or display a viewing area corresponding to the specific path.

For example, referring to FIG. 10(*b*), after a touch input of dragging in the specific direction has been applied, only if the touch input is maintained in the first region 710, the controller 180 can control the display unit 151 to display the third viewing area.

And, referring to FIG. 10(*c*), after a touch input of dragging in the specific direction has been applied, if the touch input is released, the controller 180 can control the display unit 151 to display the viewing area of the surround video based on the specific path.

Namely, after a user has changed a viewing area by touching a screen with a finger, only if the finger continues to touch the screen, the third viewing area can be displayed on the display unit 15.

Meanwhile, according to an embodiment, while a viewing area is being changed along the path, even if a motion of the mobile terminal 100 is detected, the viewing area may not be changed. If the viewing area is changed based on the motion of the mobile terminal 100, the viewing area is frequently changed in the course of changing the viewing area based on the specific path, it is highly probable that a viewing area not desired by a user is displayed.

According to the present embodiment, a user can advantageously check a different viewing area while a surround video is played along a path of a viewing area set by a different user.

Meanwhile, according to one embodiment of the present invention, if detecting a command for selecting a specific indicator in the course of changing a viewing area of a surround video currently played based on a specific path, the controller 180 may not change a viewing area of the surround video based on the specific path. This is described in detail with reference to FIG. 11.

Figure 11:
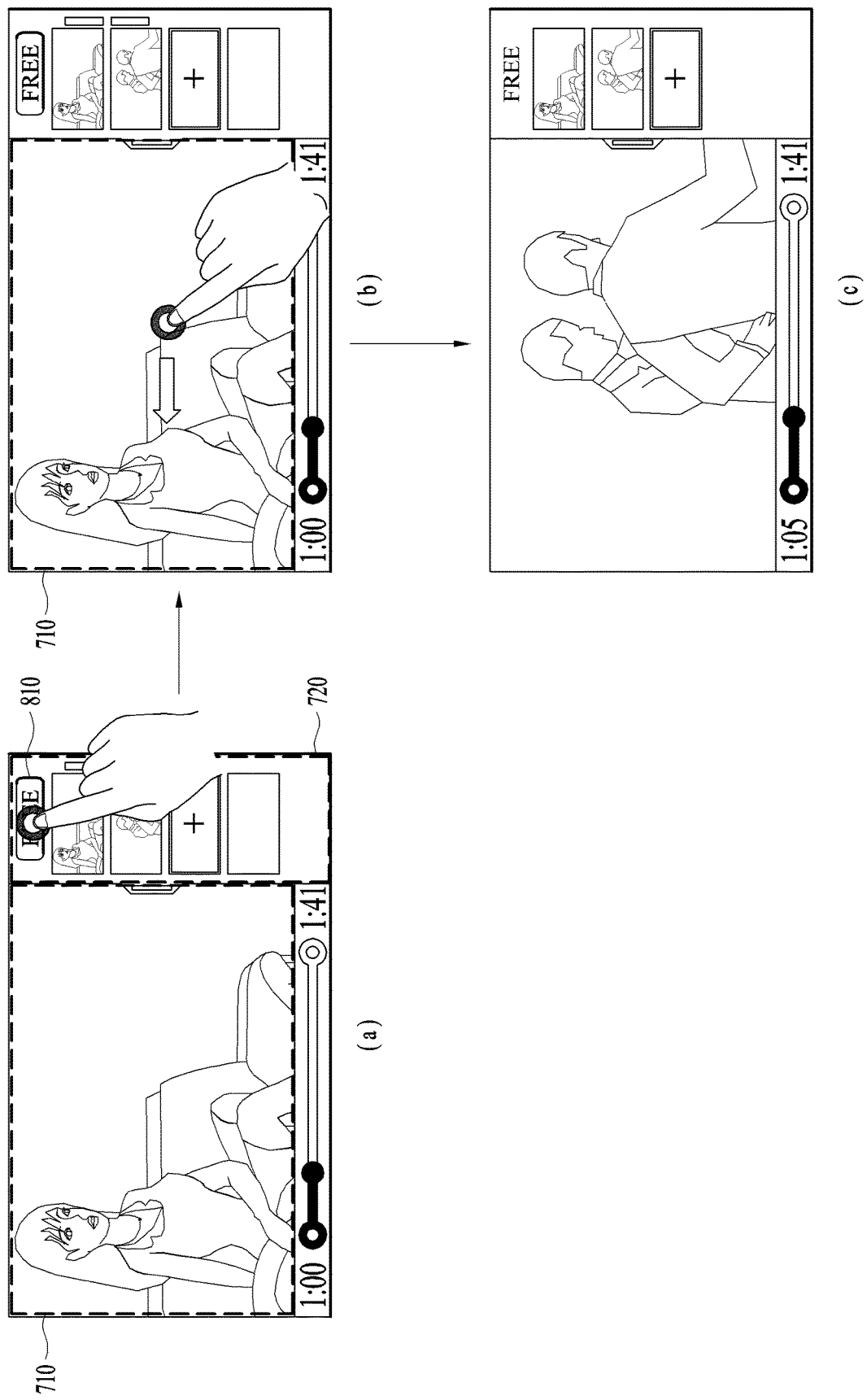
FIG. 11 is a diagram to describe a function performed in response to a command of selecting an indicator included in a GUI in a mobile terminal according to one embodiment of the present invention.

FIG. 11 is a diagram to describe a function performed in response to a command of selecting an indicator included in a GUI in a mobile terminal according to one embodiment of the present invention. With respect to FIG. 7, contents redundant with the former description with reference to FIGS. 5 to 10 shall not be described again and the following description shall be made by focusing on differences.

Regarding FIG. 11, the following description is made on the assumption that, as a user selects a specific thumbnail image included in a second region 720, a surround video is currently played based on a path corresponding to the thumbnail image.

Referring to FIG. 11(*a*), the controller 180 can change a viewing area of the currently played surround video based on the path. Particularly, the controller 180 can control the display unit 151 to display the changed viewing area in the surround video on a first region 710 of a screen.

Meanwhile, the controller 180 can control the display unit to display a GUI (graphical user interface) related to a path selection of a viewing area on a second region 720.

In response to a command for selecting a first indicator 810 included in the GUI displayed on the second region 720, the controller 180 may not change the viewing area of the currently played surround video based on the path. Namely, in response to the command for selecting the first indicator 810 (e.g., a touch command of touching the first indicator 810), the controller 180 may change the viewing area of the surround video in response to a user's input without changing it along the path.

Namely, after the first indicator 810 has been selected, if detecting a command for changing the viewing area of the surround video, the controller 180 can change the viewing area in response to the command.

For example, referring to FIG. 11(*b*), the command for changing the viewing area of the surround video may include a touch input of touching a random prescribed point within the first region 710 and then dragging it in a specific direction.

In response to the command, the controller 180 can change the viewing area in a direction opposite to the specific direction (or, in the same direction).

Referring to FIG. 11(*c*), even if the touch input is released, the controller 180 can control the display unit 151 to display the viewing area changed in response to the command. According to the present embodiment, unlike FIG. 10(*c*), it is not necessary to maintain the touch input in order to continue to display the viewing area changed in response to the touch input.

Namely, a user can freely change the viewing area by touching the first indicator 810.

According to the present embodiment, while a specific viewing area of a surround video is displayed along a specific path, if a user selects the first indicator 810, a user can freely view the surround video without restriction on a viewing path.

Figure 12:
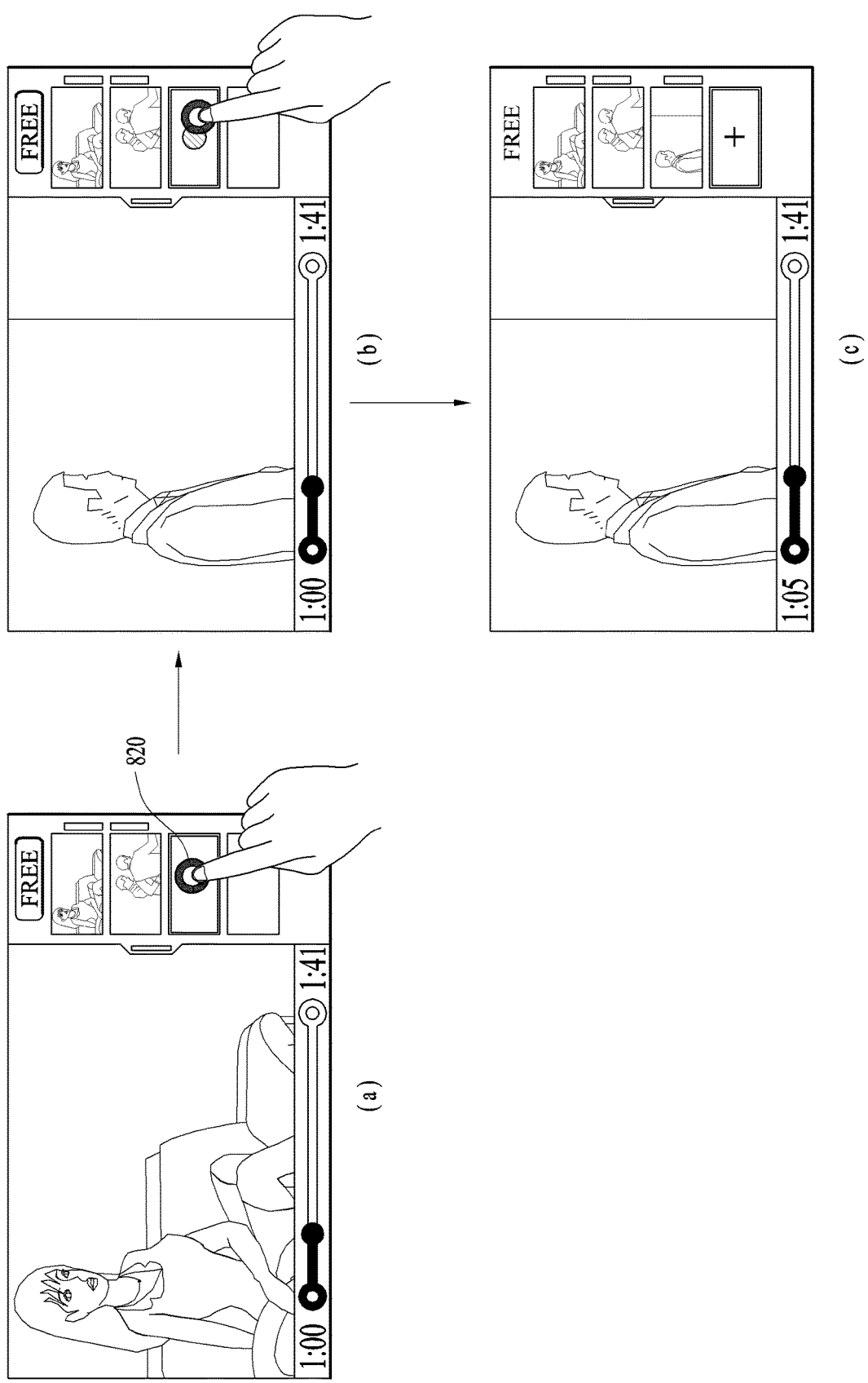
FIG. 12 is a diagram to describe one example of a method of recording a history of a viewing area in a mobile terminal according to one embodiment of the present invention.

FIG. 12 is a diagram to describe one example of a method of recording a history of a viewing area in a mobile terminal according to one embodiment of the present invention. With respect to FIG. 12, contents redundant with the former description with reference to FIGS. 5 to 11 shall not be described again and the following description shall be made by focusing on differences.

While a specific viewing area is displayed, the controller 180 can record a history of a viewing area in response to a command for selecting a second indicator 820.

Particularly, referring to FIG. 12(*a*), when a touch command of touching the second indicator 820 is detected, the controller 180 plays a surround video as a first viewing area and may change a viewing area into a second viewing area in response to a command for changing the viewing area. And, the controller 180 can save a second information corresponding to the history of the viewing area to the memory 170.

Meanwhile, in case of recording the history of the viewing area, the controller 180 can control the display unit 151 to display a specific indicator instead of the second indicator 820. For example, the specific indicator displayed instead of the second indicator 820 may include an indicator indicating 'recording in progress' [cf. FIG. 12(*b*)].

Meanwhile, referring to FIG. 12(*b*), in response to a command for selecting a displayed indicator instead of the second indicator 820, the controller 180 can terminate the storage of the path.

Referring to FIG. 12(*c*), if the storage of the path is terminated, the controller 180 can control the display unit 151 to display a thumbnail image, which indicates the path stored in the memory 170, on the second region 720. Here, the thumbnail image may include a thumbnail image that represents the path. In the memory 170, an algorithm for extracting the thumbnail image may be stored in advance.

Meanwhile, according to one embodiment of the present invention, when a history of a viewing area is saved to the memory 170, the controller 180 may display the history of the viewing area on a prescribed region of a screen. This is described in detail with reference to FIG. 13 and FIG. 14.

FIG. 13 and FIG. 14 are diagrams to describe examples of a method of displaying a history of a viewing area on a prescribed region on a screen in a mobile terminal according to one embodiment of the present invention. With respect to FIG. 13 and FIG. 14, contents redundant with the former description with reference to FIGS. 5 to 12 shall not be described again and the following description shall be made by focusing on differences.

Regarding FIG. 13 and FIG. 14, the following description is made on the assumption that a viewing area of a currently displayed surround video is being saved to the memory 170.

Referring to FIG. 13(*a*) and FIG. 14(*a*), the controller 180 can control the display unit 151 to display a first viewing area of a surround video on a first region 710. Meanwhile, the controller 180 can control the display unit 151 to display a history of a viewing area on a second region 720.

Here, the history of the viewing area may indicate a change of the viewing area. For example, while the first viewing area is displayed, if the viewing area is changed, the first viewing area can be recorded in the history of the viewing area.

In the history of the viewing area, a thumbnail image corresponding to a viewing area, which was displayed before the viewing area is changed, can be included. And, an algorithm for extracting the thumbnail image may be stored in the memory 170 in advance.

Meanwhile, referring to FIG. 13(*b*), after the surround video has been played as the first viewing area for a time less than a preset time (e.g., 5 seconds), if the viewing area is changed into a second viewing area, the first viewing area may not be recorded in the history. This is because the viewing area played for the time less than the preset time may be a viewing area watched for a while by a user to check a different viewing area.

Meanwhile, referring to FIG. 14(b), after the surround video has been played as the first viewing area for a time more than a preset time, if the viewing area is changed into a second viewing area, the first viewing area can be recorded in the history. And, the controller 180 can control the display unit 151 to display a thumbnail image corresponding to the specific viewing area on the history.

According to the present embodiment, a user can advantageously change the viewing area while checking the history in which the viewing area is changed.

Meanwhile, according to one embodiment of the present invention, in response to a specific command, the controller 180 can pair or delete a second information containing a history of a viewing area stored in the memory 170. This is described in detail with reference to FIG. 15.

FIG. 15 is a diagram to describe one example of a method of pairing or deleting information containing a history of a viewing area in a mobile terminal according to one embodiment of the present invention. With respect to FIG. 15, contents redundant with the former description with reference to FIGS. 5 to 14 shall not be described again and the following description shall be made by focusing on differences.

Regarding FIG. 15, the following description is made on the assumption that a path indicating a change of a viewing area of a surround video is stored in the memory 170 and the assumption that a thumbnail image indicating the path is displayed on a second region.

Referring to FIG. 15(a), in response to a command for selecting a thumbnail image corresponding to the path, the controller 180 can control the display unit 151 to display a GUI 900 like FIG. 15(b).

For example, the controller 180 can control the display unit 151 to display the GUI 900 in response to a touch command of touching a thumbnail image corresponding to the path indicating the change of the viewing area for a preset time.

Referring to FIG. 15(b), the GUI 900 may include a first indicator 910 corresponding to a command for saving information containing a path corresponding to the thumbnail image to the memory 170, a second indicator 920 corresponding to a function of pairing the information containing the path with an external device, a third indicator 930 corresponding to a function of deleting the information containing the path from the memory 170, and a fourth indicator 940 corresponding to a function of uploading the information containing the path to an external server.

In response to a command for selecting the first indicator 910, the controller 180 can save the path contained information to the memory 170.

In response to a command for selecting the second indicator 920, the controller 180 can pair the path contained information with a preset external device. Particularly, the controller 180 can control the wireless communication unit 110 to search for an external device to pair the information with in response to the command for selecting the second indicator 920. And, the controller 180 can control the wireless communication unit 110 to transmit the information to a user-selected external device among the found external devices.

In response to a command for selecting the third indicator 930, the controller 180 can delete the path contained information. Hence, a user can easily delete information corresponding to an unnecessary path from the memory 170.

In response to a command for selecting the fourth indicator 940, the controller 180 can upload the path contained information to a preset external server. Particularly, the controller 180 can receives a selection of an external server to upload the information thereto in response to the command for selecting the fourth indicator 940. And, the controller 180 can control the wireless communication unit 110 to upload the information to the external server selected by the user.

Meanwhile, according to one embodiment of the present invention, in response to a specific command, the controller 180 can control the display unit to display a path of a viewing area received from a preset external server or device together with a current viewing area. This is described in detail with reference to FIG. 16.

FIG. 16 is a diagram to describe one example of a method of displaying a path of a viewing area received from a preset external server or a preset external device together with a current viewing area in response to a specific command in a mobile terminal according to one embodiment of the present invention. With respect to FIG. 16, contents redundant with the former description with reference to FIGS. 5 to 15 shall not be described again and the following description shall be made by focusing on differences.

According to one embodiment of the present invention, the controller 180 can control the display unit 151 to display a specific viewing area of a surround video including a plurality of viewing areas. The controller 180 plays the surround video as a first viewing area and may play the surround video as a second viewing area in response to a first command for changing a viewing area. In response to a second command, the controller 180 can control the wireless communication unit 110 to receive data containing a path of a viewing area from a preset external device or server. And, the controller 180 can control the display unit 151 to display a thumbnail image indicating the path on a partial region of a screen using the received data.

Meanwhile, in response to a touch command [cf. FIG. 16(a)] of touching two random points on a screen and then pinching in, the controller 180 can control the display unit 151 to display a viewing area corresponding to the path among the viewing areas included in the surround video image together with a currently played viewing area [cf. FIG. 16(b)].

For example, referring to FIG. 16(b), if detecting the touch command after receiving a first data including a first path of a viewing area and a second data including a second path of a viewing area from the preset external device or server, the controller 180 can control the display unit 151 to display a viewing area corresponding to the first path and a viewing area corresponding to the second path together with a current viewing area.

Accordingly, a user can advantageously watch a surround video by comparing a current viewing area with a viewing area received from an external server or device.

Meanwhile, according to one embodiment of the present invention, when a viewing area corresponding to the first path and a viewing area corresponding to the second path are displayed, the controller 180 can change a viewing area of the current viewing area. This is described in detail with reference to FIG. 17.

FIG. 17 is a diagram to describe one example of a method of changing a current viewing area while displaying a path of a viewing area received from a preset external server or a preset external device in a mobile terminal according to one embodiment of the present invention. With respect to FIG. 17, contents redundant with the former description with reference to FIGS. 5 to 16 shall not be described again and the following description shall be made by focusing on differences.

Regarding FIG. 17, the following description is made on the assumption that a specific viewing area in a surround video image including a plurality of viewing areas is displayed on a first region 1010 of a screen and the assumption that a viewing area corresponding to a path received from an external server or device is displayed on a second region 1020.

In response to a command for changing a viewing area currently displayed on the first region 1010, the controller 180 can change the viewing area currently displayed on the first region 1010.

For example, as shown in FIG. 17(a), in response to a command of touching a random point within the first region 1010 and then dragging it in a specific direction, the controller 180 can change the viewing area displayed on the first region 1010 in a direction opposite to the specific direction (or, in the specific direction).

Referring to FIG. 17(b), when the viewing area displayed on the first region 1010 is changed, the controller 180 can control the display unit 151 to display a viewing area corresponding to the path, which is displayed on the second region 1020, together. Here, the viewing area corresponding to the path, which is displayed on the second region 1020, may be independent from the touch command. Namely, although the touch command is detected, the controller 180 changes the viewing area displayed on the first region 1010 only but may not change the viewing area displayed on the second region 1020.

According to the present embodiment, a user can advantageously watch a different viewing area while checking the viewing area corresponding to the path.

Meanwhile, according to one embodiment of the present invention, the controller 180 can control the display unit 151 to display a plurality of viewing areas included in a surround video together in response to a specific command. This is described in detail with reference to FIG. 18.

Figure 18:
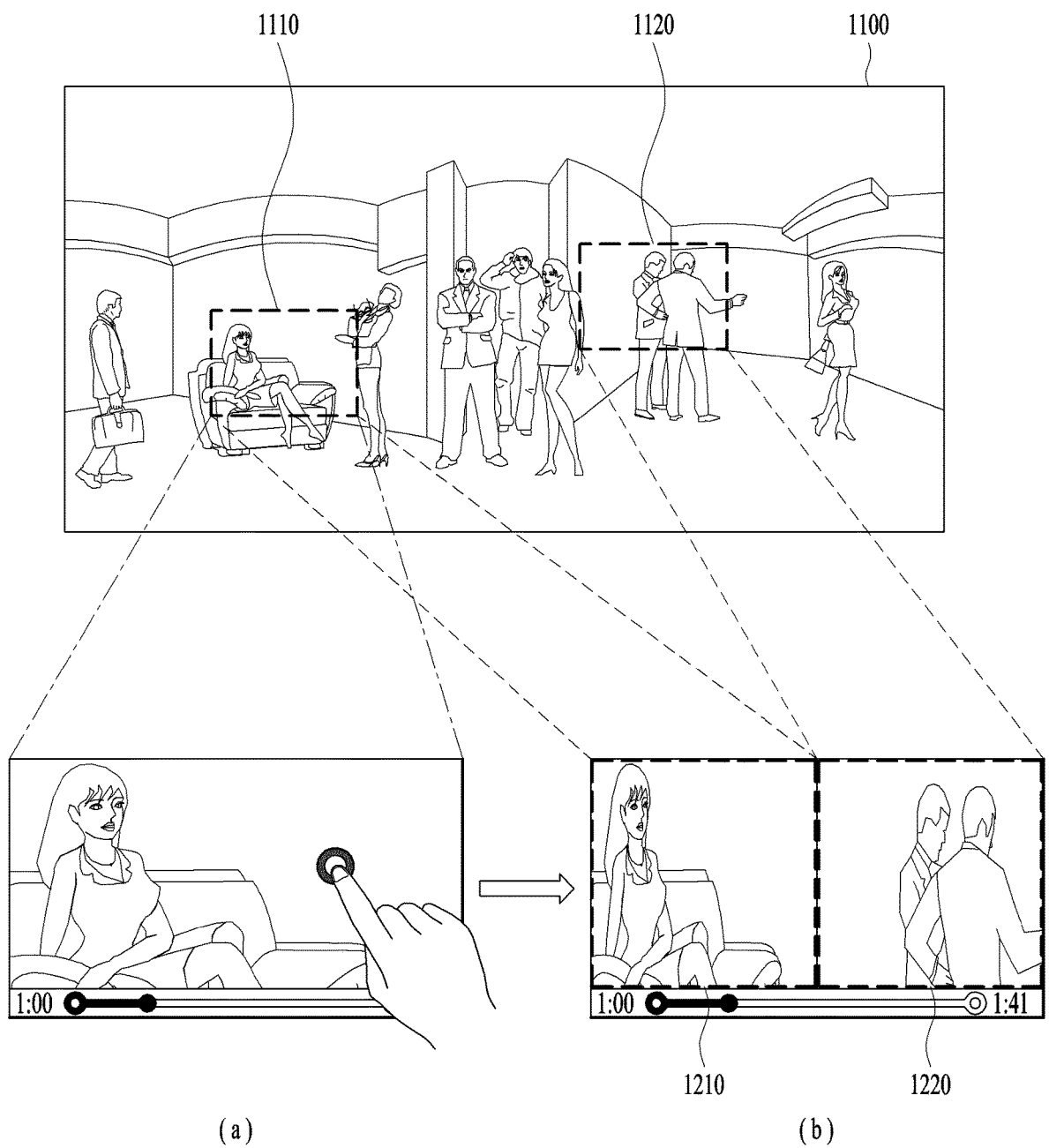
FIG. 18 is a diagram to describe one example of a method of displaying a plurality of viewing areas together in a mobile terminal according to one embodiment of the present invention.

FIG. 18 is a diagram to describe one example of a method of displaying a plurality of viewing areas together in a mobile terminal according to one embodiment of the present invention. With respect to FIG. 18, contents redundant with the former description with reference to FIGS. 5 to 17 shall not be described again and the following description shall be made by focusing on differences.

According to one embodiment of the present invention, the controller 180 can control the display unit 151 to display a specific viewing area of a surround video 1100. Here, a plurality of viewing areas can be contained in the surround video 1100. For example, the surround video 1100 may include a first viewing area 1110 and a second viewing area 1120 at least.

Referring to FIG. 18(a), the controller 180 can control the display unit 151 to display the first viewing area 1110. Here, the first viewing area 1110 may be a representative viewing area as one of a plurality of the viewing areas contained in the surround video displayed at a current timing point, or a viewing area changed in response to a viewing area change command of a user.

Meanwhile, in response to a touch command of touching a prescribed point within a screen for a predetermined time (e.g., 5 seconds), the controller 180 can control the display unit 151 to partition a screen and display a plurality of viewing area.

For example, referring to FIG. 18(b), in response to the touch command, the controller 180 can control the display unit 151 to display the first viewing area 1110 and the second viewing area 1120 different from the first viewing area together. Particularly, the controller 180 can control the display unit 151 to display the first viewing area and the second viewing area on a first region 1210 and a second region 1220 on the screen, respectively. Here, the second viewing area 1120 may include a viewing area located in a direction 180 degrees opposite to the first viewing area 1110.

Although the screen is partitioned into right and left, it can be partitioned into top and bottom. And, the screen can be partitioned through various layouts.

According to the present embodiment, a user can advantageously check a plurality of viewing areas in form of a multi-view according to a simple touch input.

Meanwhile, according to one embodiment of the present invention, while a plurality of viewing areas are displayed on a single screen, the controller 180 may change a displayed viewing area. This is described in detail with reference to FIG. 19.

Figure 19:
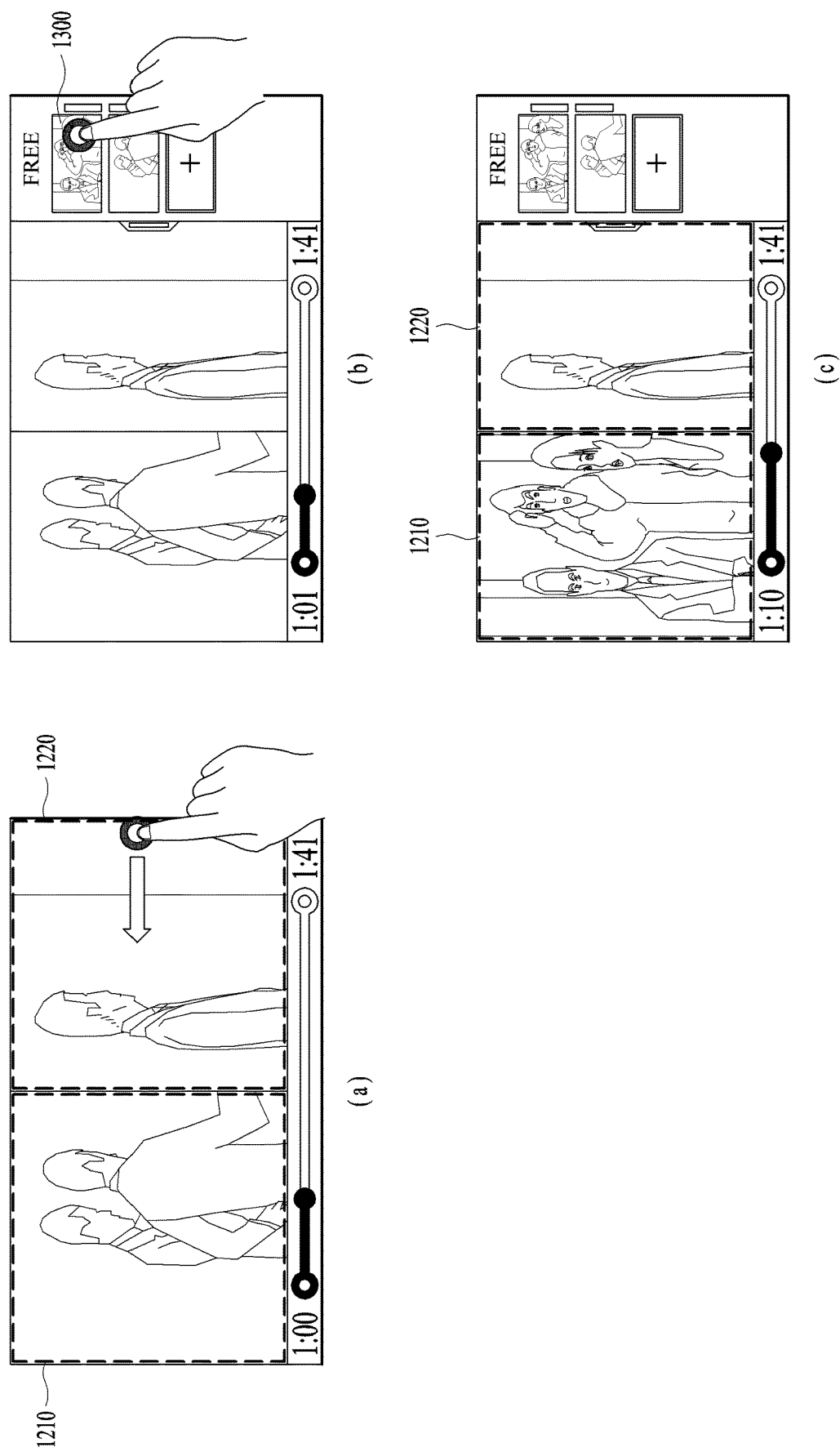
FIG. 19 is a diagram to describe one example of a method of changing a displayed viewing area in a state that a plurality of viewing areas are displayed on a single screen in a mobile terminal according to one embodiment of the present invention.

FIG. 19 is a diagram to describe one example of a method of changing a displayed viewing area in a state that a plurality of viewing areas are displayed on a single screen in a mobile terminal according to one embodiment of the present invention. With respect to FIG. 19, contents redundant with the former description with reference to FIGS. 5 to 18 shall not be described again and the following description shall be made by focusing on differences.

Regarding FIG. 19, the following description is made on the assumption that first and second viewing areas of a surround video containing a plurality of viewing areas are displayed on a screen.

Referring to FIG. 19(a), the controller 180 can display the first viewing area and the second viewing area on a first region 1210 and a second region 1220 of a screen. In response to a touch command of touching a random point (e.g., a prescribed point within a right edge region) within a screen and then dragging it in a specific direction (e.g., a left direction), the controller 180 can control the display unit 151 to display a GUI (cf. FIG. 19(b)) related to a path selection of a viewing area.

Referring to FIG. 19(b), in response to a command for selecting a specific thumbnail image 1300 from thumbnail images included in the GUI, the controller 180 can recognize a path corresponding to the thumbnail image 1300.

Referring to FIG. 19(c), based on a path corresponding to the selected thumbnail image 1300, the controller 180 can change the viewing area displayed on the first region 1210. Namely, the viewing area changed on the basis of the path corresponding to the selected thumbnail image 1300 can be displayed on the first region 1210. Here, the display unit 151 can be controlled in a manner that the second viewing area is intactly displayed on the second region 1220.

Regarding the present embodiment, the viewing area changed on the basis of the path is displayed on the first region 120, by which the present embodiment is non-limited. Instead, the viewing area changed on the basis of the path is displayed on the second region 1220 and the first viewing area may be displayed on the first region 1210.

Meanwhile, according to one embodiment of the present invention, the controller 180 can change a currently displayed viewing area in response to a specific command. This is described in detail with reference to FIG. 20.

Figure 20:
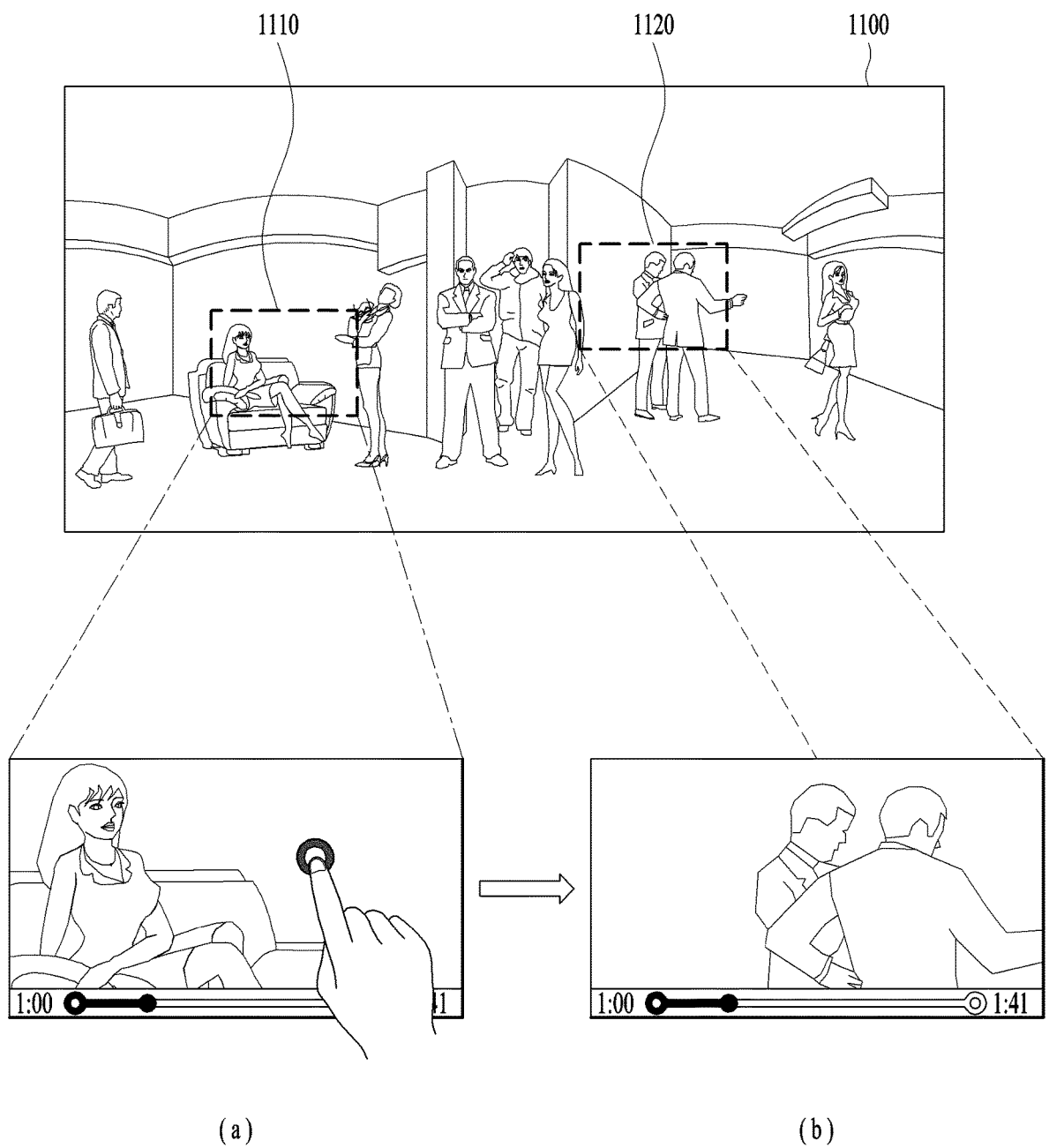
FIG. 20 is a diagram to describe one example of a method of changing a currently displayed viewing area in response to a specific command in a mobile terminal according to one embodiment of the present invention.

FIG. 20 is a diagram to describe one example of a method of changing a currently displayed viewing area in response to a specific command in a mobile terminal according to one embodiment of the present invention. With respect to FIG. 20, contents redundant with the former description with reference to FIGS. 5 to 19 shall not be described again and the following description shall be made by focusing on differences.

According to one embodiment of the present invention, the controller 180 can control the display unit 151 to display a specific viewing area of a surround video 1100. Here, a plurality of viewing areas can be contained in the surround video 1100. For example, the surround video 1100 may include a first viewing area 1110 and a second viewing area 1120 at least.

Referring to FIG. 20(a), the controller 180 can control the display unit 151 to display the first viewing area 1110. Here, the first viewing area 1110 may be a representative viewing area as one of a plurality of the viewing areas contained in the surround video displayed at a current timing point, or a viewing area changed in response to a viewing area change command of a user.

Meanwhile, in response to a touch command of touching a prescribed point within a screen for a predetermined time (e.g., 5 seconds) [cf. FIG. 20(a)], the controller 180 can control the display unit 151 to display a viewing area different from the first viewing area.

For example, referring to FIG. 20(b), in response to the touch command, the controller 180 can control the display unit 151 to display the second viewing area 1120 different from the first viewing area. Here, the second viewing area 1120 may include a viewing area located in a direction 180 degrees opposite to the first viewing area 1110.

According to the present embodiment, a user can advantageously check a different viewing area according to a simple touch input.

Meanwhile, according to one embodiment of the present invention, in case that a viewing area is changed into a different viewing area from a currently displayed viewing area, the controller 180 can save information corresponding to a history of the viewing area to the memory 170. This is described in detail with reference to FIG. 21.

FIG. 21 is a diagram to describe one example of a method of if a viewing area is changed from a currently displayed viewing area into a different viewing area, saving information corresponding to a history of the viewing area to a memory in a mobile terminal according to one embodiment of the present invention. With respect to FIG. 21, contents redundant with the former description with reference to FIGS. 5 to 20 shall not be described again and the following description shall be made by focusing on differences.

According to one embodiment of the present invention, the controller 180 can control the display unit 151 to display a specific viewing area of a surround video containing a plurality of viewing areas.

For example, the controller 180 can control the display unit 151 to display a representative viewing area corresponding to a current timing point when the surround video is played.

For another example, the controller 180 can control the display unit 151 to display a viewing area changed in response to a viewing area change command when the surround video is played.

Meanwhile, if the viewing area is changed in response to the viewing area change command, the controller 180 can save information corresponding to the history of the viewing area to the memory 170. Namely, if the viewing area change command is detected, the controller 180 can recognize it as a command for recording the history of the viewing area.

Particularly, referring to FIG. 21(a), while a specific viewing area of the surround video is played, in response to a touch command of touching a prescribed point on a screen and then dragging it in a specific direction, the controller 180 can change the viewing area in a direction corresponding to the touch command (or, in an opposite direction). And, the controller 180 can save information corresponding to a viewing area changed history to the memory 170.

Referring to FIG. 21(b), when the history of the viewing area is saved to the memory 170, the controller 180 can control the display unit 151 to display the history of the viewing area on a partial region 1210 of the screen.

For example, while a first viewing area of the surround video is displayed, if detecting a command for changing the viewing area into a second viewing area, the controller 180 can save information, which indicates that the first viewing area was viewed, to the memory 170. And, the controller 180 can control the display unit 151 to display the viewing area history, which indicates that the first viewing area was viewed, on the partial region 1210 of the screen.

Meanwhile, according to an embodiment, only if the surround video is played as the first viewing area over a preset time, the controller 180 can record the first viewing area in the history of the viewing area. This is not to save information on a viewing area, which was checked to view a surround video as a different viewing area, separately.

FIG. 22 is a diagram to describe one example of a method of playing a surround video at a specific timing using information corresponding to a history stored in a memory in a mobile terminal according to one embodiment of the present invention. With respect to FIG. 22, contents redundant with the former description with reference to FIGS. 5 to 21 shall not be described again and the following description shall be made by focusing on differences.

According to one embodiment of the present invention, the controller 180 can control the display unit 151 to display a specific viewing area of a surround video containing a plurality of viewing areas. In response to a command for recording a history of a viewing area, the controller 180 can save information corresponding to the history of the viewing area to the memory 170. Here, the information corresponding to the history of the viewing area may include change information of a viewing area, information on a viewing area changed timing point, etc.

Referring to FIG. 22(a), the controller 180 can control the display unit 151 to display a history of a viewing area on a partial region of a screen.

For example, a history indicating that a surround video was played as a second viewing area after being played as a first viewing may be stored in the information corresponding to the history.

Particularly, in the viewing area history displayed on the partial region of the screen, a thumbnail image 1310 corresponding to the first viewing area and a thumbnail image 1320 corresponding to the second viewing area may be included.

In response to a command for selecting the thumbnail image 1310 corresponding to the first viewing area, the controller 180 can change a play timing point and a viewing area of the surround video.

Particularly, referring to FIG. 22(b), in response to a command for selecting the thumbnail image 1310 corresponding to the first viewing area, the controller 180 can change a surround video play timing point into a timing point at which the surround video was viewed as the first viewing area. In doing so, the controller 180 can play the surround video as the first viewing area. Namely, in response to a command for selecting the thumbnail image 1310 corresponding to the first viewing area, the controller 180 can play the surround video as the first viewing area by starting with a play timing point indicated by the thumbnail image 1310 corresponding to the first viewing area.

According to the present embodiment, a user can advantageously change a viewing area and a play timing point according to a simple touch input.

FIG. 23 is a diagram to describe one example of a method of changing a viewing area using information corresponding to a history stored in a memory in a mobile terminal according to one embodiment of the present invention. With respect to FIG. 23, contents redundant with the former description with reference to FIGS. 5 to 22 shall not be described again and the following description shall be made by focusing on differences.

According to one embodiment of the present invention, the controller 180 can control the display unit 151 to display a specific viewing area of a surround video containing a plurality of viewing areas. In response to a command for recording a history of a viewing area, the controller 180 can save information corresponding to the history of the viewing area to the memory 170. Here, the information corresponding to the history of the viewing area may include change information of a viewing area, information on a viewing area changed timing point, etc.

Referring to FIG. 23(a), the controller 180 can control the display unit 151 to display a history of a viewing area on a partial region of a screen.

For example, a history indicating that a surround video was played as a second viewing area after being played as a first viewing may be stored in the information corresponding to the history.

Particularly, in the viewing area history displayed on the partial region of the screen, a thumbnail image 1310 corresponding to the first viewing area and a thumbnail image 1320 corresponding to the second viewing area may be included.

In response to a command for selecting the thumbnail image 1310 corresponding to the first viewing area, the controller 180 can change a viewing area of the surround video.

Particularly, referring to FIG. 23(b), in response to a command for selecting the thumbnail image 1310 corresponding to the first viewing area, the controller 180 can change the viewing area of the surround video into the first viewing area.

According to the present embodiment, a user can advantageously change a viewing area according to a simple touch input.

Figure 24:
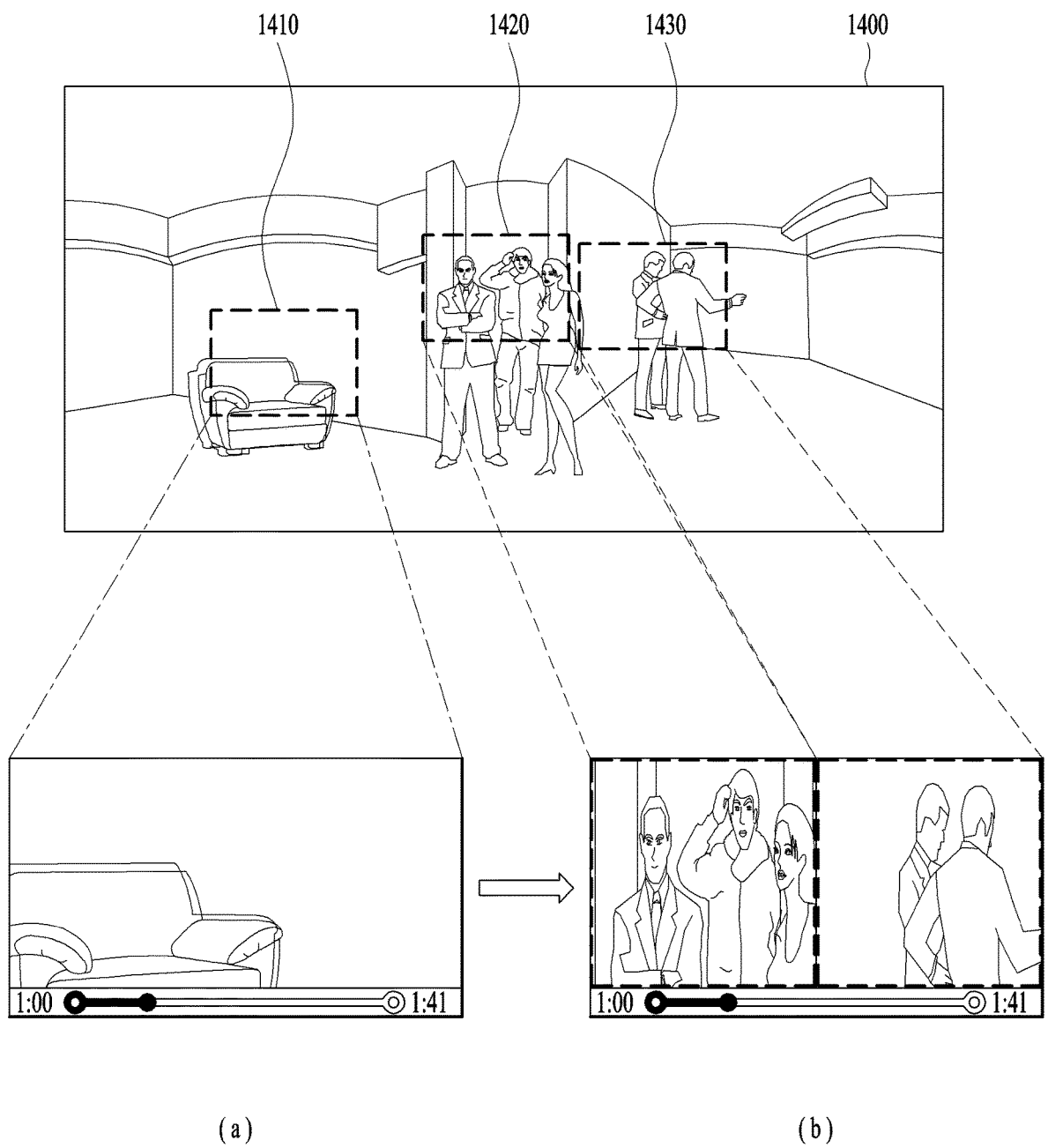
FIG. 24 is a diagram to describe one example of a method of displaying a specific event existing viewing area within a surround video in a mobile terminal according to one embodiment of the present invention.

FIG. 24 is a diagram to describe one example of a method of displaying a specific event existing viewing area within a surround video in a mobile terminal according to one embodiment of the present invention. With respect to FIG. 24, contents redundant with the former description with reference to FIGS. 5 to 23 shall not be described again and the following description shall be made by focusing on differences.

According to one embodiment of the present invention, the controller 180 can control the display unit 151 to display a specific viewing area of a surround video 1400. Here, a plurality of viewing areas may be included in the surround video 1400. For example, the surround video 1400 may include a first viewing area 1410, a second viewing area 1420 and a third viewing area 1430 at least.

Referring to FIG. 24(a), the controller 180 can control the display unit 151 to display the first viewing area 1110. Here, the first viewing area 1110 may be a representative viewing area as one of a plurality of the viewing areas contained in the surround video displayed at a current timing point, or a viewing area changed in response to a viewing area change command of a user.

Meanwhile, in response to a touch command (cf. FIG. 24(a)) of touching two random points within a screen for a preset time (e.g., 5 seconds), the controller 180 can control the display unit 151 to display a viewing area in which a preset event exists. Here, the preset event may include a change of an object included in the surround video (e.g., an addition of a character), a motion of an object included in the surround video, and the like.

For example, referring to FIG. 24(b), in response to the touch command, the controller 180 can recognize a human existing viewing area in the surround video. And, the controller 180 can recognize the human existing viewing area as a preset event existing viewing area. And, the controller 180 can control the display unit 151 to display the viewing area in which the preset event exists. in doing so, if there are a plurality of the preset event existing viewing areas, the controller 180 can control the display unit 151 to display all of a plurality of the viewing areas.

For example, in case of recognizing that a preset event (e.g., a human existing event) exists in the second and third viewing areas 1420 and 1430 included in the surround video, the controller 180 can control the display unit 151 to display the second viewing area 1420 and the third viewing area 1430.

Meanwhile, according to an embodiment, in case that an object included in the surround video moves, the controller 180 can control a viewing area of the surround video to be changed in response to the movement. An algorithm for changing a viewing area in response to a movement of an object included in the surround video may be stored in the memory 170 in advance. Namely, although the object included in the surround video moves, the controller 180 can change the viewing area so that the object can continue to be displayed.

Figure 25:
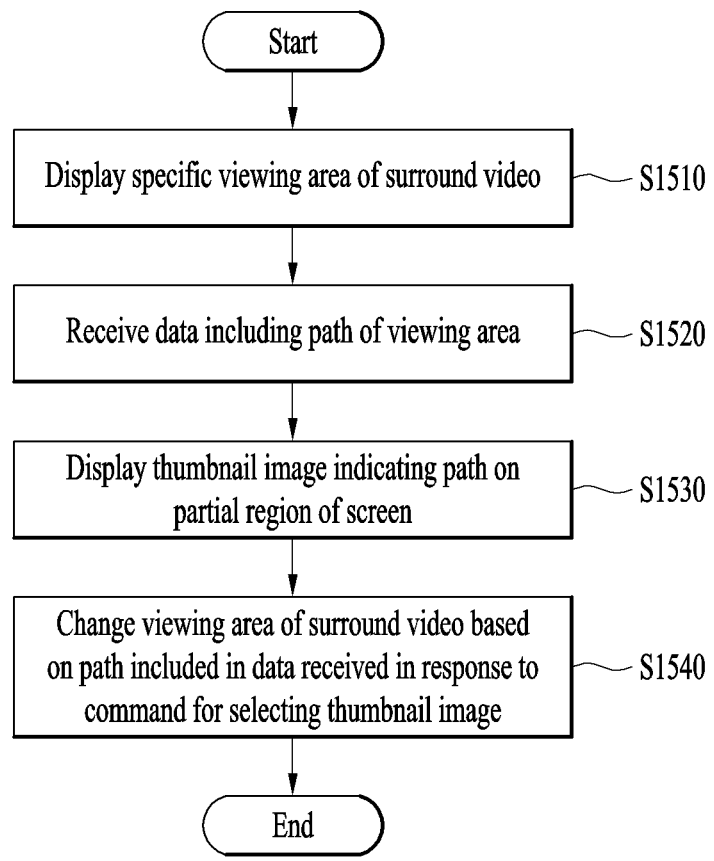
FIG. 25 is a flowchart showing a method of changing a viewing area in a mobile terminal according to one embodiment of the present invention.

FIG. 25 is a flowchart showing a method of changing a viewing area in a mobile terminal according to one embodiment of the present invention. With respect to FIG. 25, contents redundant with the former description with reference to FIGS. 5 to 24 shall not be described again and the following description shall be made by focusing on differences.

According to one embodiment of the present invention, the controller 180 can control the display unit 151 to display a specific area of a surround video [S1510]. Particularly, the controller 180 plays the surround video as a representative viewing area. In response to a command for changing a viewing area, the controller 180 may play the surround video as a viewing area corresponding to the command.

Meanwhile, the controller 180 can control the wireless communication unit 110 to receive data including a path of a viewing area from a preset external device or server in response to a specific command [S1520]. Here, the path may include a path of a viewing area set for the surround video by a different user.

Meanwhile, the controller 180 can control the display unit 151 to display a thumbnail image indicating the path on a partial region of a screen using the received data [S1530].

In response to a command for selecting a prescribed one of thumbnail image displayed on the partial region, the controller 180 can change the viewing area of the currently played surround video based on the path included in the data corresponding to the selected thumbnail image [S1540].

According to at least one of the embodiments of the present invention, it is advantageous in that a surround video can be played along a path of a viewing area configured by a different user. According to at least one of the embodiments of the present invention, it is advantageous in saving a path of a viewing area of a surround video displayed in a mobile terminal to a memory and enabling the saved path to be shared with a different user.

The present invention mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. The foregoing embodiments are merely exemplary and are not to be considered as limiting the present disclosure. The present teachings can be readily applied to other types of methods and apparatuses. Thus, it is intended that the present invention covers the modifications and variations of this invention that come within the scope of the appended claims and their equivalents.

MODE FOR INVENTION

Various embodiments are described in 'BEST MODE FOR INVENTION' for implementing the present invention.

INDUSTRIAL APPLICABILITY

The present invention is used for the fields related to a mobile terminal configured to display a surround video.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to transceive data with an external device or an external server;
a display unit configured to display a specific viewing area of a surround video including a plurality of viewing areas; and
a controller configured to play the surround video as a first viewing area and play the surround video as a second viewing area in response to a first command for changing a viewing area,
wherein the controller is further configured to:
control the wireless communication unit to receive data including a path of the viewing area from a preset external device or a preset external server in response to a second command,
control the display unit to display a thumbnail image indicating the path on a partial region of a screen using the received data,
change the viewing area of the currently played surround video based on the path included in the received data in response to a third command for selecting the thumbnail image,
in response to detecting a touch input corresponding to a viewing area change in the course of changing the viewing area of the currently played surround video along the path of the viewing area, change the viewing area of the currently played surround video into a third viewing area corresponding to the detected touch input, and
in response to the touch input being maintained, maintain the third viewing area of the currently played surround video,
wherein the surround video includes a video image captured via a plurality of cameras, and
wherein the plurality of viewing areas is part of the full image.

2. The mobile terminal of claim 1, wherein if receiving a first data including a first path of the viewing area and a second data including a second path of the viewing area from the preset external device or the preset external server, the controller is further configured to control the display unit to display a first thumbnail image indicating the first path and a second thumbnail image indicating the second path on the partial region using the received first data and the received second data.

3. The mobile terminal of claim 2, wherein the controller is further configured to change the viewing area of the currently played surround video based on the first path in response to a command for selecting the first thumbnail image.

4. The mobile terminal of claim 2, wherein the controller is further configured to change the viewing area of the currently played surround video based on the second path in response to a command for selecting the second thumbnail image.

5. The mobile terminal of claim 4, wherein the controller is further configured to control the display unit to display the history of the viewing area on the partial region.

6. The mobile terminal of claim 1, wherein if the touch input is released, the controller is further configured to change the viewing area of the currently played surround video based on the path again.

7. The mobile terminal of claim 6, wherein in response to a fifth command, the controller is further configured to control the wireless communication unit to pair second information.

8. The mobile terminal of claim 1, wherein the controller is further configured to:
play the surround video as the first viewing area in response to a fourth command for recording a history of the viewing area,
change the viewing area into the second viewing area in response to the first command, and
save a second information corresponding to the history of the viewing area to a memory.

9. The mobile terminal of claim 8, wherein if the surround video is played as the first viewing area over a preset time, the controller is further configured to record the first viewing area in the history of the viewing area.

10. A method of controlling a mobile terminal, comprising:
playing a surround video including a plurality of viewing areas as a first viewing area in a manner of playing the surround video as a second viewing area in response to a first command for changing a viewing area;
receiving data including a path of the viewing area from a preset external device or a preset external server in response to a second command;
displaying a thumbnail image indicating the path on a partial region of a screen using the received data;

changing the viewing area of the currently played surround video based on the path included in the received data in response to a third command for selecting the thumbnail image;

in response to detecting a touch input corresponding to a viewing area change in the course of changing the viewing area of the currently played surround video along the path of the viewing area, changing the viewing area of the currently played surround video into a third viewing area corresponding to the detected touch input; and in response to the touch input being maintained, maintaining the third viewing area of the currently played surround video, wherein the surround video includes a video image captured via a plurality of cameras, and wherein the plurality of viewing areas is part of the full image.

11. The method of claim 10, further comprising, if receiving a first data including a first path of the viewing area and a second data including a second path of the viewing area from the preset external device or the preset external server, displaying a first thumbnail image indicating the first path and a second thumbnail image indicating the second path on the partial region using the received first data and the received second data.

12. The method of claim 11, further comprising, changing the viewing area of the currently played surround video based on the first path in response to a command for selecting the first thumbnail image.

13. The method of claim 11, further comprising, changing the viewing area of the currently played surround video based on the second path in response to a command for selecting the second thumbnail image.

14. The method of claim 13, further comprising displaying the history of the viewing area on the partial region.

15. The method of claim 10, further comprising, if the touch input is released, changing the viewing area of the currently played surround video based on the path again.

16. The method of claim 10, further comprising the steps of:

playing the surround video as the first viewing area in response to a fifth command for recording a history of the viewing area in a manner of changing the viewing area into the second viewing area in response to the first command; and saving a second information corresponding to the history of the viewing area to a memory.

17. The method of claim 16, further comprising, if the surround video is played as the first viewing area over a preset time, recording the first viewing area in the history of the viewing area.

18. The method of claim 16, wherein in response to a sixth command, pairing the second information.

* * * * *